US006457916B2

(12) United States Patent
Wienhold

(10) Patent No.: US 6,457,916 B2
(45) Date of Patent: Oct. 1, 2002

(54) LOCKING QUICK-CHANGE CHUCK ASSEMBLY

(75) Inventor: James L. Wienhold, Minneapolis, MN (US)

(73) Assignee: Insty-Bit, Inc., Minneapolis, MN (US)

( * ) Notice: Subject to any disclaimer, the term of this patent is extended or adjusted under 35 U.S.C. 154(b) by 0 days.

(21) Appl. No.: 09/713,579

(22) Filed: Nov. 15, 2000

Related U.S. Application Data

(60) Provisional application No. 60/165,520, filed on Nov. 15, 1999.

(51) Int. Cl.[7] ........................ B23B 31/107; B23B 31/06

(52) U.S. Cl. ........................... 408/240; 279/30; 279/75; 279/155; 279/905

(58) Field of Search ............................. 279/22, 30, 75, 279/155, 905; 408/240

(56) References Cited

U.S. PATENT DOCUMENTS

| | | | |
|---|---|---|---|
| 81,260 A | 8/1868 | Davis | |
| 87,715 A | 3/1869 | Sible | |
| 1,031,914 A | 7/1912 | Clouse | |
| 1,602,708 A | 10/1926 | Russell | |
| 2,350,565 A | 6/1944 | Mills | 279/76 |
| 2,370,487 A | 2/1945 | Poutie | 279/42 |
| 2,736,562 A | 2/1956 | Blackburn | 279/76 |
| 2,767,992 A | 10/1956 | Emrick | 279/82 |
| 2,807,473 A | 9/1957 | Kiehne | 279/82 |

(List continued on next page.)

FOREIGN PATENT DOCUMENTS

DE 1 552 404 12/1969 ................ 408/238

OTHER PUBLICATIONS

Brochure entitled "Insty–Bit Patented Quick Change System," 1993/1994, by Wienhold Associates, Minneapolis, MN 55426.

Brochure entitled "Insty–Bit® Quick–Change Drilling System," 1991–1993, by Wienhold Associates, Minneapolis, MN 55426.

Borchure entitled "Insty–Bit® Patented Quick–Change System," 1994, by Insty–Bit, Inc., Minneapolis, MN 55405.

Article entitled "Faster, Better Drilling for Finish Carpenters," *Fine Homebuilding*, by Bruce Greenlaw, Feb./Mar. 1996.

Declaration of James L. Wienhold Regarding Stanley® Drill Chuck obtained Aug. 28, 2000.

*Primary Examiner*—Steven C. Bishop
(74) *Attorney, Agent, or Firm*—Kinney & Lange, P.A.

(57) ABSTRACT

The invention is an improvement to a chuck assembly of the type having a chuck hub with a longitudinally extending bore therein the longitudinally extending bore having a closed end, an open end, and a radially extending bit bore in communication with the longitudinally extending bore, and a bit ball movable in the ball bore between a first retracted position out of the longitudinally extending bore and a second engaged position partially in the longitudinally extending bore. The inventive improvement includes a shuttle slidably disposed in the longitudinally extending bore. The shuttle has a first longitudinally extending portion having a first lateral dimension and a second longitudinally extending portion having a second, smaller lateral dimension. The shuttle is movable longitudinally between a first release position and a second lock position. The inventive improvement also includes a compression spring urging the shuttle away from the closed end of the longitudinally extending bore, and a shuttle ball disposed in a radially extending shuttle ball bore in the chuck hub which is in communication with the longitudinally extending bore of the chuck hub. The shuttle ball is movable in the shuttle ball bore between a first retracted position where the shuttle ball contacts the first longitudinally extending portion of the shuttle and a second extended position where the shuttle ball contacts the second longitudinally extending portion of the shuttle.

20 Claims, 12 Drawing Sheets

U.S. PATENT DOCUMENTS

| | | | | | |
|---|---|---|---|---|---|
| 2,926,020 | A | | 2/1960 | Dayton et al. | 279/75 |
| 2,965,382 | A | | 12/1960 | Schlage | 279/77 |
| 2,987,334 | A | | 6/1961 | Wendling | 287/119 |
| 3,216,471 | A | | 11/1965 | Wendel | 145/61 |
| 3,220,743 | A | | 11/1965 | Knapp | 279/28 |
| 3,255,792 | A | | 6/1966 | Beck | 145/64 |
| 3,367,727 | A | | 2/1968 | Ward et al. | 306/28 |
| 3,558,146 | A | | 1/1971 | Mayers et al. | 279/28 |
| 3,583,715 | A | | 6/1971 | Jahrl | 279/75 |
| 3,658,351 | A | * | 4/1972 | Benjamin et al. | 279/75 |
| 3,672,692 | A | | 6/1972 | Fauth | 279/82 |
| 3,756,737 | A | | 9/1973 | Smith | 408/239 |
| 3,758,222 | A | | 9/1973 | Oakes | 408/224 |
| 3,788,658 | A | * | 1/1974 | Benjamin et al. | 279/75 |
| 3,932,904 | A | | 1/1976 | Nilsson et al. | 7/14.1 R |
| 3,937,119 | A | | 2/1976 | Ernst | 85/47 |
| 3,945,653 | A | | 3/1976 | Falchle | 279/97 |
| 3,965,510 | A | | 6/1976 | Ernst | 7/14.1 R |
| 4,184,692 | A | | 1/1980 | Benson et al. | 279/75 |
| 4,209,182 | A | | 6/1980 | Sheldon | 279/75 |
| 4,210,215 | A | | 7/1980 | Peetz et al. | 175/394 |
| D257,511 | S | | 11/1980 | Zahn | D15/139 |
| 4,290,617 | A | | 9/1981 | Yoshida | 279/75 |
| 4,381,116 | A | | 4/1983 | Futter | 279/62 |
| 4,413,937 | A | | 11/1983 | Gutsche | 408/239 |
| 4,434,859 | A | | 3/1984 | Rumpp et al. | 173/48 |
| RE31,755 | E | | 12/1984 | Wanner et al. | 464/167 |
| 4,514,117 | A | | 4/1985 | Scott | 408/239 |
| 4,577,875 | A | | 3/1986 | Miyakawa | 279/75 |
| 4,582,458 | A | | 4/1986 | Korb et al. | 408/224 |
| 4,588,335 | A | | 5/1986 | Pearson, Jr. | 408/239 |
| 4,594,036 | A | | 6/1986 | Hogenhout | 408/240 |
| 4,629,375 | A | | 12/1986 | Lieser | 408/239 |
| 4,692,073 | A | | 9/1987 | Martindell | 408/239 |
| 4,708,548 | A | | 11/1987 | Taylor et al. | 409/234 |
| 4,710,079 | A | | 12/1987 | Smith et al. | 409/234 |
| 4,711,457 | A | | 12/1987 | Wezel | 279/65 |
| 4,789,276 | A | | 12/1988 | Clarke | 408/230 |
| 4,858,939 | A | | 8/1989 | Riggs | 279/75 |
| 4,900,202 | A | | 2/1990 | Wienhold | 408/240 |
| 4,990,038 | A | | 2/1991 | DeLong | 408/127 |
| 5,013,194 | A | | 5/1991 | Wienhold | 408/240 |
| 5,062,749 | A | * | 11/1991 | Sheets | 408/240 |
| D347,848 | S | | 6/1994 | Maynard, Jr. | D15/139 |
| 5,387,059 | A | | 2/1995 | Borzemsky | 408/226 |
| 5,417,527 | A | | 5/1995 | Wienhold | 408/239 |
| 5,466,100 | A | | 11/1995 | Ahluwalia | 408/224 |
| D390,239 | S | | 2/1998 | Malin | D15/139 |
| 5,722,805 | A | | 3/1998 | Griffin | 408/239 |
| 5,782,636 | A | | 7/1998 | Armstrong et al. | 433/165 |
| 5,797,711 | A | | 8/1998 | Mulgrave et al. | 408/226 |
| D408,424 | S | | 4/1999 | Schmotzer | D15/139 |
| D419,575 | S | | 1/2000 | Kouvelis | D15/139 |
| 6,135,462 | A | | 10/2000 | Robison | 279/137 |
| 6,199,872 | B1 | * | 3/2001 | Hasan | 279/30 |
| 6,270,085 | B1 | * | 8/2001 | Chen et al. | 279/22 |
| 2002/0020973 | A1 | * | 2/2002 | Cantlon | 279/75 |

* cited by examiner

LOCKING QUICK-CHANGE CHUCK ASSEMBLY

CROSS-REFERENCE TO RELATED APPLICATION

This application claims priority from Provisional Application No. 60/165,520 filed Nov. 15, 1999, for "LOCKING QUICK-CHANGE CHUCK ASSEMBLY" by J. Wienhold.

BACKGROUND OF THE INVENTION

This invention relates to chuck assemblies for tool bits and, more particularly to a quick release chuck adapted for releasing the bit from the chuck using one hand.

Tool bits include tools used for drilling, driving, fastener devices such as screws, nuts and bolts, and other work elements requiring rotational motion. The American National Standards Institute has a specification for such tools known as ANSI B 107.4-1982 which refers to driving and spindle ends for portable powered and hand held machines using tool bits. Tool bits in accordance with the standard have a hexagonally configured shank with a circumferential groove formed into the shank. The circumferential groove has a flat, bottom portion disposed between two radiused shoulder portions. The standard reflects a long term and pervasive use of such tool bits and the large inventory of tools available.

It has long been recognized that the ability to quickly change tool bits in the spindle of the power source is an advantageous feature. Numerous examples exist in the art of quick release tool chucks. Quick release chucks using spring biased sleeves disposed on a spindle are known in prior art.

One common method of using the spring biased sleeve to retain the tool bit in the chuck is by urging a ball into contact with the circumferential groove of the tool bit and maintaining the ball in position by a shoulder (or cam surface) mounted on the sleeve. The ball is urged into contact with the groove and maintained in position by a compression spring disposed between the spindle and the sleeve. A ring secured to the spindle limits the movement of the sleeve in one direction, and the compression spring limits the movement of the sleeve in the opposite direction.

The tool bit is prevented from being axially extracted from the chuck by the shoulder. The spring biased shoulder is urged against the ball which locks it against a retaining face. Attempting to extract the tool bit from the bore without release of the detent ball pulls the ball against the retaining face. Therefore the shoulder locks the ball into the circumferential groove. The resulting force prevents extraction of the tool bit from the shank receiving bore. To release the tool bit from the receiving bore the user must retract the sleeve. The retracted sleeve acts to compress the spring which removes the shoulder from the locking position and allows the ball to move out of the circumferential groove of the tool bit.

Since it is necessary to manually retract the sleeve against the force provided by the compression spring, the user must use both hands to remove the tool bit. One hand is used to provide a constant force to compress the spring, while the other hand removes the bit from the bore. This often causes problems for workers (i.e., construction workers and carpenters) who regularly change drill bits in numerous types of construction projects. The worker is often in a position where it is difficult to change the bit, such as on a ladder.

Changing the bit may not only be inconvenient, but also dangerous. The worker may attempt to move the sleeve against the compression spring with one hand, using his or her body (or some stationary object) to provide pressure force against the power tool while he or she removes the tool bit with his or her second hand. Alternatively, the worker may attempt to hold onto the power tool handle with one hand, and simultaneously attempt to retract and hold the sleeve in a compressed position while removing the tool bit with the other hand. These awkward methods of changing of the bit often result in the worker losing his or her grip on the bit or on the tool and dropping it. At the very least, dropping the tool or bit causes the worker the inconvenience of having to descend the ladder to retrieve the bit. At worst, the bit could fall onto someone standing below, causing serious harm.

BRIEF SUMMARY OF THE INVENTION

The invention is a chuck assembly for a tool bit which includes a spindle with a quick release mechanism adapted to allow the user to place the chuck assembly in a lock mode or a loading and unloading position.

The tool bit includes a shank portion with a circumferential groove in accordance with the ANSI standard. A longitudinally extending bore is provided in the spindle for receiving the shank portion of the tool bit. A first detent ball is disposed in a radially extending bore communicating with the shank receiving bore.

A spring biased sleeve shoulder is selectivly urged against the first detent ball, locking it against a retaining face. Attempted axial extraction of the tool bit from the bore presses the ball against the retaining face, producing an opposite tangential force to the axial retraction force. Manually moving the sleeve shoulder by moving a sleeve compresses the spring and releases the tool bit. A second detent ball is in communication with the sleeve and a spring biased shuttle in the bore. A hollow disposed on the shuttle locks the sleeve in place, preventing the shoulder from locking the first detent ball against the retaining face.

Attempting to lock the first detent ball into position against the tool bit circumferential groove without retracting the second detent ball from engagement with the sleeve results in the loss of the opposite tangential force to the axial retraction force. When the sleeve is in a retracted position, the tool bit may be axially extracted from the shank receiving bore. The second detent ball must be disengaged from locking the sleeve in a retracted position before the sleeve can lock the tool bit into place.

The invention can be defined as an improvement to a chuck assembly of the type having a chuck hub with a longitudinally extending bore therein the longitudinally extending bore having a closed end, an open end, and a radially extending bit bore in communication with the longitudinally extending bore, and a bit ball movable in the ball bore between a first retracted position out of the longitudinally extending bore and a second engaged position partially in the longitudinally extending bore. The inventive improvement includes a shuttle slidably disposed in the longitudinally extending bore. The shuttle has a first longitudinally extending portion having a first lateral dimension and a second longitudinally extending portion having a second, smaller lateral dimension. The shuttle is movable longitudinally between a first release position and a second lock position. The inventive improvement also includes a compression spring urging the shuttle away from the closed end of the longitudinally extending bore, and a shuttle ball disposed in a radially extending shuttle ball bore in the chuck hub which is in communication with the longitudinally extending bore of the chuck hub. The shuttle ball is movable in the shuttle ball bore between a first retracted position where the shuttle ball contacts the first longitudinally extending portion of the shuttle and a second extended position where the shuttle ball contacts the second longitudinally extending portion of the shuttle.

In one preferred embodiment, when the shuttle ball is in its second extended position, it extends further into the longitudinally extending bore than the bit ball, when the bit ball is in its second engaged position.

Preferably, the improved chuck hub also includes a sleeve movable relative to the chuck hub between a first shuttle release position and a second shuttle lock position. The sleeve has a first shuttle ball contact surface having a first radial dimension and a second shuttle ball contact surface having a second smaller radial dimension. The first contact surface engages the shuttle ball when the sleeve is in its first shuttle release position and the shuttle ball is in its first retracted position, and the second contact surface engages the shuttle ball when the sleeve is in the second shuttle locked position and the shuttle ball is in its second extended position.

The sleeve is preferably movable longitudinally relative to the chuck hub. The second shuttle ball contact surface on the sleeve is preferably an inner circumferential surface. In a preferred embodiment, the chuck hub has an outer circumferential surface adjacent the shuttle ball bore, and the inner circumferential surface of the sleeve has a slightly larger diameter than the outer circumferential surface of the chuck hub.

The present invention can also be defined as a locking chuck assembly for a tool bit shank of the type which has a circumferential groove disposed thereabout. The chuck assembly includes a chuck hub having a forward face and a fixed radial extension. A longitudinal bore is provided in the hub for receiving the tool bit shank, with the longitudinal bore having a terminating face. A shuttle is disposed in the bore. The shuttle has a bit end, a spring end, a forward lower face and a rearward interim face, and the shuttle is slidable along the longitudinal bore between a rearward position and a forward position. A shuttle spring is disposed between the spring end of the shuttle and the terminating face of the bore, with the shuttle spring acting to bias the shuttle to its forward position. A rear bore extends radially through the hub proximate the terminating face of the longitudinal bore so as to be in communication with the longitudinal bore, and a shuttle detent ball is disposed in the rear bore so as to engage the shuttle. A front bore extends radially through the hub proximate the forward face so as to be in communication with the longitudinal bore, and a bit detent ball is disposed in the front bore so as to engage the circumferential groove of the tool bit shank. A sleeve is disposed annularly about the chuck hub, and is slidable along the chuck hub between a tool bit loaded position and a load/unload position. A sleeve spring is disposed between the fixed radial extension of the hub and the sleeve to bias the sleeve toward its tool bit loaded position. When the sleeve is disposed in its tool bit loaded position, the shuttle is positioned in its rearward position such that the shuttle spring is compressed and the shuttle detent ball is engaged with the forward lower face on the shuttle so as to prevent the shuttle spring from moving the shuttle, while allowing the sleeve spring to bias the sleeve. When the sleeve is disposed in its load/unload position, the shuttle is positioned in its forward position such that the shuttle spring is less compressed than when the shuttle is in its rearward position and the shuttle detent ball is engaged with the rearward interim face on the shuttle and the sleeve is in a position to allow the shuttle spring to bias the shuttle away from the terminating face of the bore.

BRIEF DESCRIPTION OF THE DRAWINGS

The present invention will be further explained with reference to the drawing figures referenced below, wherein like structure is referred to by like numerals throughout the several views.

While the above-identified drawings set forth preferred embodiments of the present invention, other embodiments of the present invention are also contemplated, as noted in the discussion. This disclosure presents illustrative embodiments of the present invention by the way of representation and not limitation. Numerous other modifications and embodiments can be devised by those skilled in the art which fall within scope and spirit of the principles of this invention.

DETAILED DESCRIPTION

Figure 1:
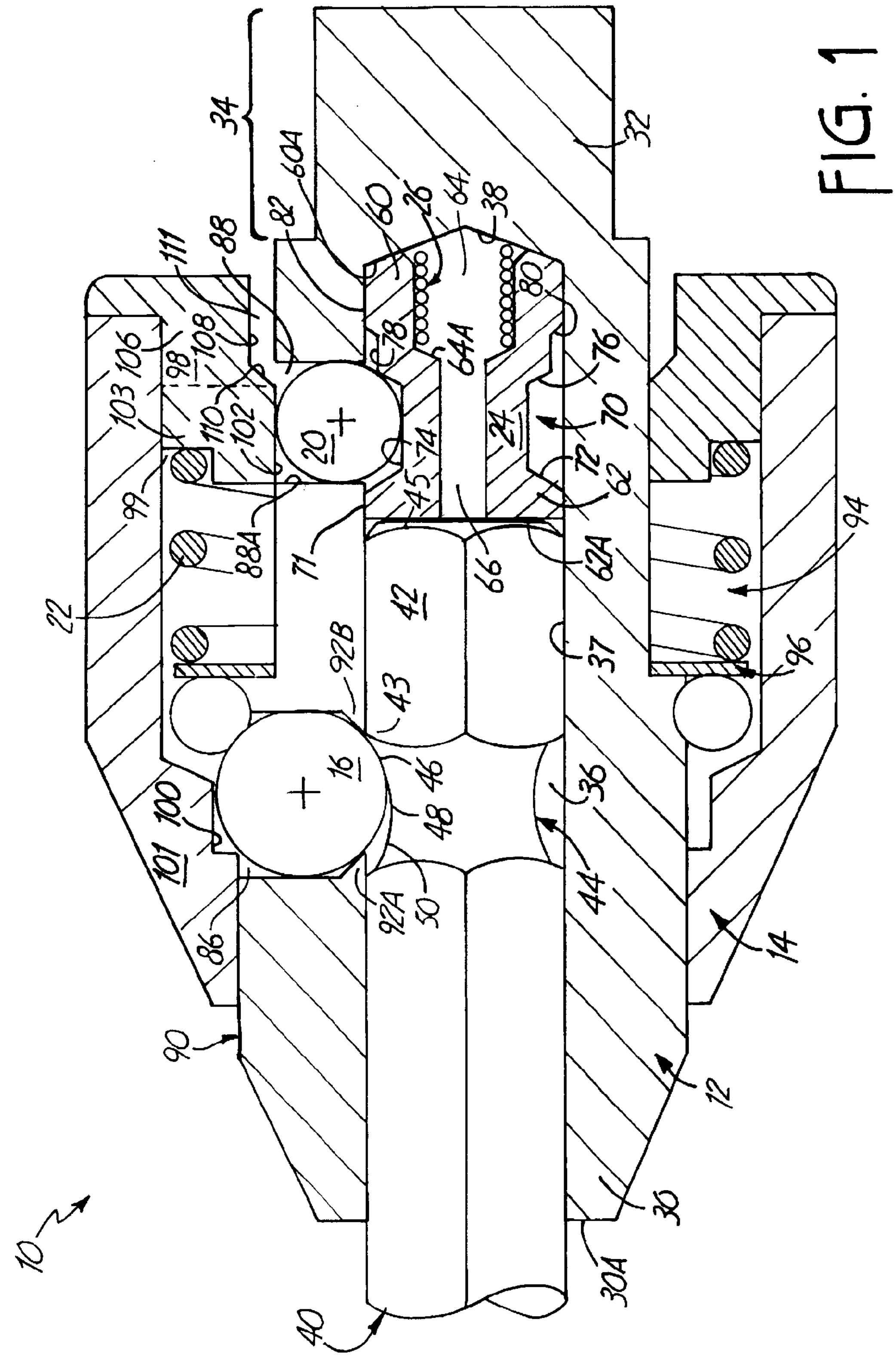
FIG. 1 shows a cross-sectional view of the chuck assembly showing the quick release feature of the chuck, with a first fitted shank portion from a tool bit extended into the chuck assembly.

The present invention is a quick change chuck for a tool bit illustrated generally at 10 in FIG. 1. The chuck 10 includes a chuck hub 12, a sleeve 14, a bit detent ball 16, a shuttle detent ball 20, a sleeve spring 22, a shuttle 24 and a shuttle spring 26.

The chuck hub 12 includes a forward distal end 30 and a driven proximal end 32. The driven end 32 is shaped to form a spindle 34 (typically having a hexagonally shaped cross-section) to provide a connection to the power tool. The forward end 30 terminates in a forward face 30A. A hexagonal bore 36 extends perpendicularly into the forward face 30A and axially towards the driven end 32 of the hub 12. The hexagonal bore 36 is centered in the forward face 30A, is substantially aligned along the longitudinal axis of the hub 12 and is shaped to admit a standard quick release tool bit 40. The bore 36 includes an inner wall 37 and terminates in the hub 12 along a terminating face 38. Preferably, the terminating face 38 is generally perpendicular to the longitudinal axis of the hub 12, although a person skilled in the art would realize the terminating face 38 may have a concavity (as shown) due to the boring process.

The tool bit 40 includes a hexagonally shaped shank 42. The shank 42 includes a circumferential groove 44 near a proximal end 45 of the shank 42. The circumferential groove 44 includes three distinct surface profiles, including a radially inwardly extending rear radiused shoulder 46, a centered flat portion 48 and a radially inwardly extending forward radiused shoulder 50.

The shuttle 24 is coaxial with the chuck hub 12 and is slidably disposed in the hexagonal bore 36, between the shank 42 of the tool bit 40 and the terminating face 38 of the bore 36. The shuttle 24 has a proximal spring end 60 and a distal bit end 62. The spring end 60 includes a spring face 60A which is preferably shaped so as to contiguously engage the terminating face 38 of the bore 36. Preferably, a spring bore 64 extends distally into the spring face 60A, coaxial with the longitudinal axis of the shuttle 24 (and the hub 12). The spring bore 64 terminates in the shuttle 24 along a distal bore shoulder 64A. The bore shoulder 64A is generally perpendicular to the longitudinal axis of the shuttle 24 (although, as shown, a concavity may exist due to the boring process). The bit end 62 of the shuttle 24 includes a bit face 62A substantially perpendicular to the longitudinal axis of the hub 12. The bit face 62A is shaped to engage the proximal end 45 of the shank 42 of the tool bit 40.

A protrusion bore 66 is disposed perpendicularly into the bit face 62A. and extends through the shuttle 24 into the spring bore 64. The protrusion bore 66 is an optional feature providing clearance for a protrusion disposed on the proximal end of a non-standard tool bit (not shown). Non-standard bits utilizing protrusions are known in the art, and the protrusion may serve a variety of purposes (for example, the protrusion may provide a hex wrench for adjustment of features integral to the tool bit). Although the protrusion bore 66 is depicted as being cylindrical, a person skilled in the art would realize that other bore shapes (i.e., hexagonal) can be used. Additionally, the protrusion bore 66 need not be in communication with the spring bore 64, and may be omitted from the chuck 10, without departing from the spirit and scope of the invention.

The shuttle spring 26 is disposed in the spring bore 64. One end of the shuttle spring 26 engages the terminating face 38 of the hexagonal bore 36 and the other end engages the bore shoulder 64A of the spring bore 64. The shuttle spring 26 is of the compression spring type, so that the spring 26 urges the shuttle 24 axially away from the terminating face 38 of the bore 36 and towards the forward end 30 of the chuck hub 12.

A locking hollow 70 is disposed annularly around the shuttle 24. Although a person skilled in the art would realize the locking hollow 70 can have any one of several profiles, the preferred embodiment is illustrated in FIG. 1. The locking hollow 70 includes a forward face 71 disposed in the bit end 62 of the shuttle 24 and contiguous with the inner wall 37 of the bore 36. A forward wall 72 is adjacent to and rearward from the forward face 71. The forward wall 72 extends from the forward face 71 radially inward (towards the longitudinal axis of the shuttle 24) and slightly rearward (towards the driven end 32 of the hub 12). Rearward from and adjacent to the forward face 72 is a lower face 74. The lower face 74 extends substantially parallel to the longitudinal axis of the shuttle 24. An interim wall 76 extends from the lower face 74 radially outward and slightly rearward. Rearward from and adjacent to the interim wall 76 is an interim face 78. The interim face 78 extends generally parallel to the longitudinal axis of the shuttle 24 at a position outward from the lower face 74. The interim face 78 extends rearwardly from the interim wall 76. A rear wall 80 extends from the interim face 78 radially outward and slightly rearward, terminating at the inner wall 37 of the bore 36. A rear face 82 is substantially in contiguous engagement with the inner wall 37 of the bore 36.

Front and rear radially extending bores 86 and 88 communicate with hexagonal bore 36, extending from the inner wall 37 of the hexagonal bore 36 through the hub 12 to an outer cylindrical surface 90 of the hub 12. The outer surface 90 extends the length of the chuck hub 12. The bit detent ball 16 and the shuttle detent ball 20 are disposed in the radially extending bores 86 and 88, respectively. Preferably, the balls 16 and 20 are sized to fit loosely into the radially extending bores 86 and 88, permitting the balls 16 and 20 to move axially within the bores 86 and 88 respectively. The bit detent ball 16 is able to extend into the hexagonal bore 36, coming into contact with the tool bit 40. The shuttle detent ball 20 is able to extend into the hexagonal bore 36, coming into contact with the locking hollow 70 of the shuttle 24. Shoulders 92A and 92B are disposed in the front bore 86 adjacent to the tool bit shank 42 to prevent the bit detent ball 16 from passing completely into the hexagonal bore 36.

The bit detent ball 16 and the shuttle detent ball 20 are held in their respective positions of extending into the hexagonal bore 36 by the moveable sleeve 14 disposed around the outer cylindrical surface 90. The sleeve 14 is coaxially mounted relative to the hub 12. The sleeve 14 is disposable between a rearward (or "locking" or "tool bit loaded") position and a forward (or "retracted" or "load/unload") position. To hold the bit detent ball 16 in place, the moveable sleeve 14 (in the preferred embodiment) must be in a maximum rearward position (towards the driven end 32 of the chuck hub 12). The sleeve 14 is biased towards the rearward position by the sleeve spring 22. The sleeve spring 22 is held in a rear cavity 94 of the moveable sleeve 14. The rear cavity 94 is disposed between the sleeve 14 and the hub outer cylindrical surface 90. The sleeve spring 22 bears against a surface such as a washer (or c-clip) 96 mounted around the outer cylindrical surface 90 on one end and a rear shoulder 98 of the sleeve 14 on the other end. It would be understood by a person skilled in the art that the washer or c-clip could be fixed relative to the chuck hub 12 by any number of methods, including welding it in place, disposing it in a groove formed in the chuck hub 12 or abutting it against a shoulder of the chuck hub 12. Additionally, the washer 96 can be an integral part of the chuck hub 12.

Figure 2:
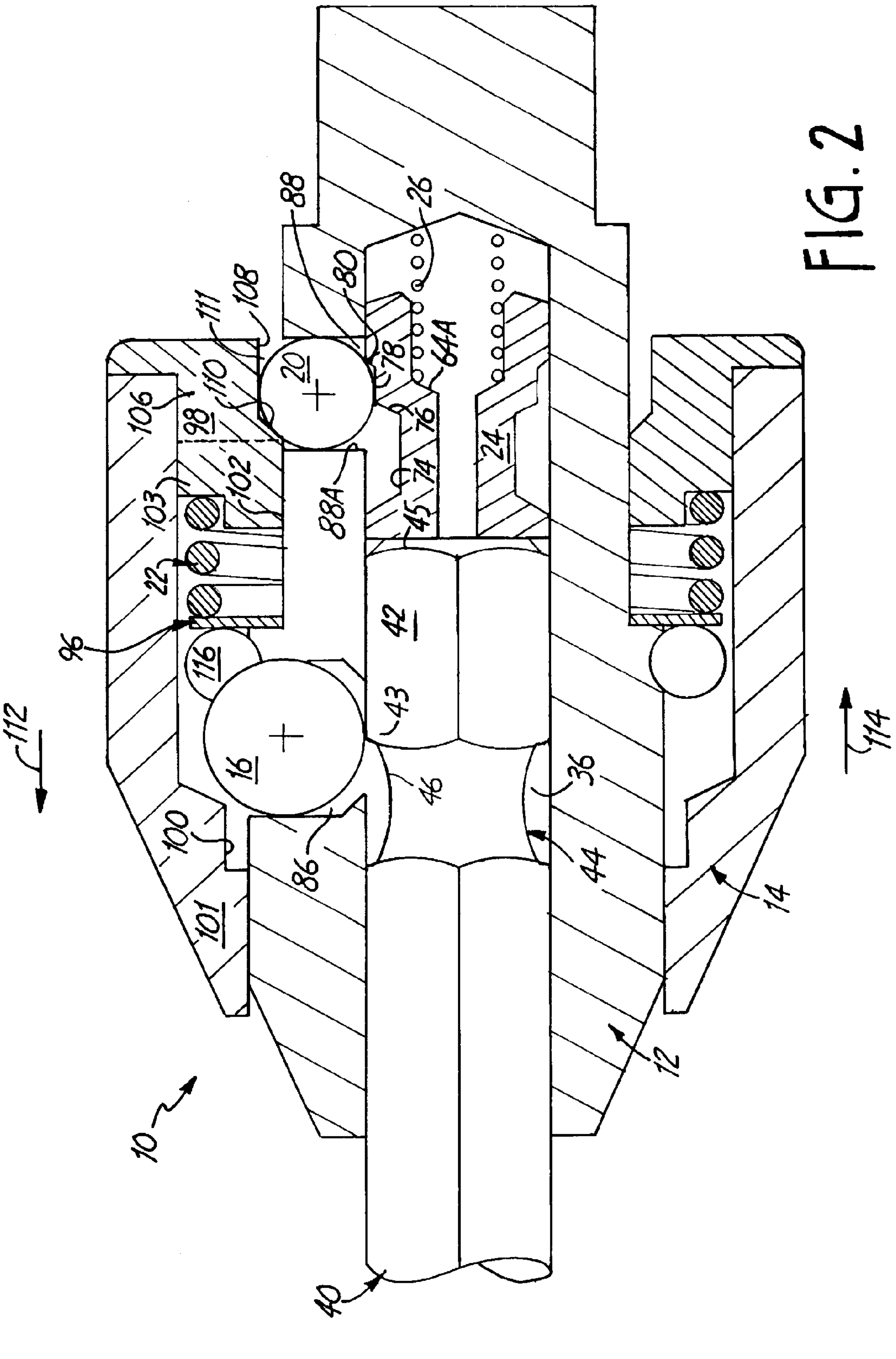
FIG. 2 is a cross-sectional view of the chuck assembly showing the quick release feature of the chuck in the loading and unloading position.

Forward longitudinal movement of the moveable sleeve 14 relative to the hub 12 compresses the sleeve spring 22 between the washer 96 and the rear shoulder 98 (discussed further with respect to FIG. 2). Preferably, a notch 99 is disposed in the rear shoulder 98 to seat the sleeve spring 22 on the rear shoulder 98. Thus, the sleeve spring 22 biases the moveable sleeve 14 rearward, bringing an inner face 100 of forward shoulder 101 into contact with the bit detent ball 16 and causing an inner face 102 of the rear shoulder 98 to interact with the shuttle detent ball 20.

The forward shoulder 101 urges the detent ball 16 radially inward into contact with the retaining shoulders 92A and 92B of the front bore 86. In its rearward biased position, the forward shoulder 101 thus holds the bit detent ball 16 against the tool bit 40 in the hexagonal bore 36. The forward shoulder 101 has a profile which locks and holds the bit detent ball 16 in place. The use of a shoulder profile to hold a detent ball in the circumferential groove of a tool bit is known in the art and is described in U.S. Pat. Nos. 4,900,202 and 5,013,194, both of which are incorporated by reference herein in their entirety.

The forward shoulder 101 applies a force to the bit detent ball 16 normal to the longitudinal axis of the hub 12. The walls of the front bore 86 as well as a portion of the forward shoulder 101 apply a force to the bit detent ball 16 parallel to the longitudinal axis of the hub 12. These longitudinal forces, along with frictional forces between the hub 12, the ball 16 and the bit 40, prevent rotation of the bit detent ball 16. Locking the position of the bit detent ball 16 thus fixes the position of the tool bit 40 in the hexagonal bore 36. The circumferential groove 44 is substantially aligned with the front bore 86 when the shank 42 of the tool bit 40 is fully admitted to the hexagonal bore 36. At such time, the shank 42 abuts the bit face 62A of the shuttle 24. Forward or outward axial forces applied to the tool bit 40 bring the rear radiused shoulder 46 into contact with the bit detent ball 16. Preferably, the radius of the radiused shoulder 46 is substantially the same as the radius of the bit detent ball 16 and accordingly the ball 16 makes contact along the entirety of the shoulder 46. Since the ball 16 is locked in place as described, the ball 16 transmits an opposite responsive axial force to the forward or outward axial forces, preventing the extraction of the bit 40. It would be understood by a person skilled in the art that the size of the bit detent ball 16 (as well as the shuttle detent ball 20) can be varied without departing from the spirit and scope of the invention.

The rear shoulder 98 has a first portion 103 which extends from the sleeve 14 through the rear cavity 94 and terminates at the outer cylindrical surface 90 of the hub 12, at the inner face 102. A second portion 106 of the rear shoulder 98 is integral to the first portion 103 and disposed adjacent and rearwardly from the first portion 103. The second portion 106 extends from the sleeve 14 and terminates at an outer face 108. The outer face 108 is disposed radially outward from the inner face 102. Thus, a cavity 111 is created between the outer surface 90 of the hub 12 and the outer face 108 of the rear shoulder 98. Retaining face 110 extends radially from the inner face 102 to the outer face 108. When the sleeve 14 is in its rearward biased position, the inner face 102 is engaged with the shuttle detent ball 20. The shuttle detent ball 20 is disposed into the hexagonal bore 36 into contact with the lower face 74 and interim wall 76 of the shuttle 24. In the tool bit loaded mode of FIG. 1. the shuttle 24 is biased in a rearward position, compressing the shuttle spring 26.

The shuttle detent ball 20 acts to prevent the shuttle spring 26 from urging the shuttle 24 forward. The interim wall 76 transfers the axial spring force to the ball 20. The ball 20 is prevented from moving in the longitudinal direction of the hub 12 by a wall 88A of the rear bore 88 and prevented from moving normally to the longitudinal axis of the hub 12 by the inner face 102 of the rear shoulder 98 and the lower face 74 of the shuttle 24.

The tool bit 40 is removed from the chuck 10 as illustrated in FIG. 2. The sleeve 14 is moved forward in the direction of arrow 112 by the operator, compressing the sleeve spring 22. The forward shoulder 101 is disengaged from the bit detent ball 16. Thus, the ball 16 is free to rotate as well as move radially out of the hexagonal bore 36 by moving radially out of the front bore 86.

Additionally, the forward movement 112 of the sleeve 14 moves the shuttle detent ball 20 radially out of the hexagonal bore 36 through the rear bore 88. The first portion 103 of the rear shoulder 98 is moved forward relative to the rear bore 88, so that the inner face 102 no longer prevents the shuttle detent ball 20 from moving radially outward from the hexagonal bore 36. The outer face 108 of the rear shoulder 98 is substantially aligned radially outward from the rear bore 88. The shuttle detent ball 20 is free to travel into the cavity 111 formed between the outer face 108 and the outer surface 90 of the chuck hub 12.

The shuttle spring 26 urges the shuttle 24 forward and the shuttle detent ball 20 is pushed radially outward, through the rear bore 88 by the interim wall 76. The ball 20 moves radially outwardly until it encounters the outer face 108 of the rear shoulder 98. Although the ball 20 moves outwardly enough for the interim wall 76 to pass forward of the ball 20, the ball 20 is stopped by the outer face 108 of the rear shoulder 98 before it can pass completely out of the hexagonal bore 36. The shuttle 24 is thus free to move forward until the rear wall 80 strikes the shuttle detent ball 20 (although other walls or protrusions may be used to stop the forward travel of the shuttle, as is discussed with respect to FIGS. 12–12B). The forward movement of the shuttle 24 is halted by the detent ball 20, and the axial force of the shuttle spring 26 on the shuttle detent ball 20 is countered in the axial direction by the wall 88A of the rear bore 88 and in the normal direction by the outer face 108 of the rear shoulder 98. The shuttle 24 is thereby prevented from being pushed out of the hexagonal bore 36 by the shuttle spring 26 and is disposed in a “forward” position.

Once the sleeve 14 is moved by the operator forward 112 so that the shuttle detent ball 20 is able to move outward into the rear shoulder cavity 111, the operator can let go of the sleeve 14. The sleeve 14 is urged rearward in direction of arrow 114 (FIG. 2) by the sleeve spring 22. However, retaining face 110 engages the shuttle detent ball 20, and prevents the sleeve 14 from returning to the rearward position (its position in FIG. 1). The longitudinal force of the sleeve spring 22 is transferred by the retaining face 110 of the rear shoulder 98 to the shuttle detent ball 20. The longitudinal force of the sleeve spring 22 on the shuttle detent ball 20 is countered longitudinally by the wall 88A of the rear bore 88 and normally by the interim face 78 of the shuttle 24. The chuck 10 is thereby placed in load/unload mode, with the sleeve 14 locked in the forward position.

In this mode (FIG. 2) the operator can pull the bit 40 from the hexagonal bore 36. Since the sleeve 14 is locked into place relative to the hub 12, the operator may use the same hand used to slide the sleeve 14 forward as is used to withdraw the bit 40, preventing the likelihood of dropping the bit 40 or the power tool. Preferably, the forward movement of the shuttle 24 pushes the tool bit 40 partially out of the hexagonal bore 36. Moving the tool bit 40 axially out of the chuck 10 (in direction of arrow 112) displaces the bit detent ball 16 radially outwardly as the ball 16 rides up the rear radiused shoulder 46 out of the circumferential groove 44 and onto a rear part 43 of the shank 42. The tool bit 40 is now easily removed from the hexagonal bore 36, allowing replacement of the tool bit 40 with the shank of another tool bit.

Preferably, an elastomeric O-ring 116 is disposed annularly around the hub 12 between the washer 96 and the bit detent ball 16. The O-ring 16 is uncompressed when the bit detent ball 16 is disposed radially into the hexagonal bore 36. When the operator extracts the tool bit 40 from the hexagonal bore 36, the O-ring 116 is compressed as the detent ball 16 rides the rear radiused shoulder 46 onto the rear part 43 of the shank 42. Thus, when the sleeve 14 is disposed in the forward locked position (FIG. 2), the bit detent ball 16 is urged into (but not locked into) the hexagonal bore 36 by the O-ring. The O-ring 116 (through its action on the ball 16) creates some frictional resistance to the axial withdrawal of the bit 40, and thus prevents the tool bit 40 from accidentally sliding out of the hexagonal bore 36 (due to gravity, etc.), once again preventing accidental dropping of the bit 40. Therefore, the tool bit 40 must be extracted by the operator in order to remove the tool bit 40 from the bore 36.

Figure 3:
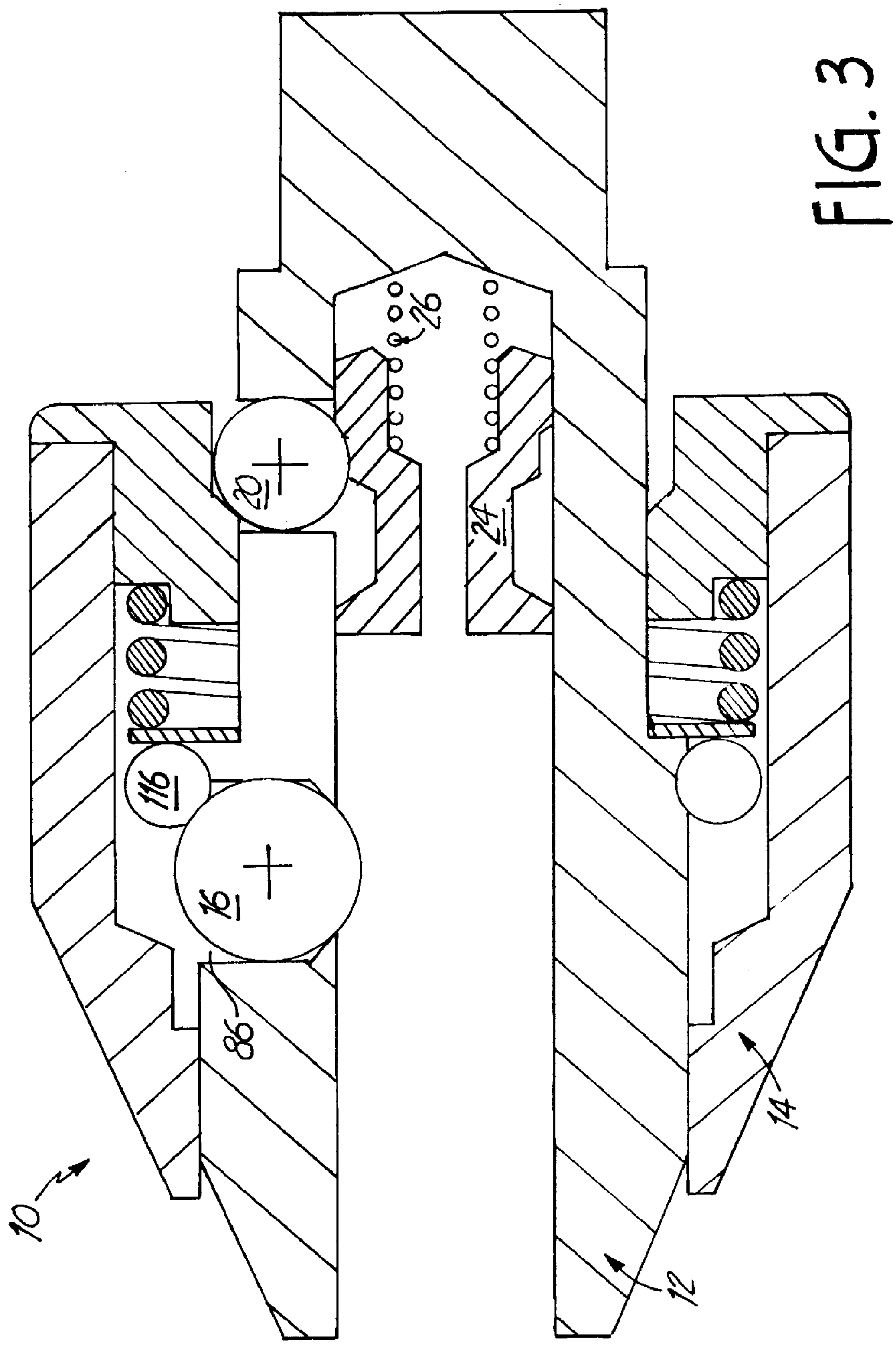
FIG. 3 shows a cross-sectional view of the chuck assembly showing the chuck assembly in the open position.

Once the bit 40 has been extracted from the hexagonal bore 36, the O-ring 116 releasably urges the bit detent ball 16 radially inward into the hexagonal bore 36, as illustrated in FIG. 3.

Figure 4:
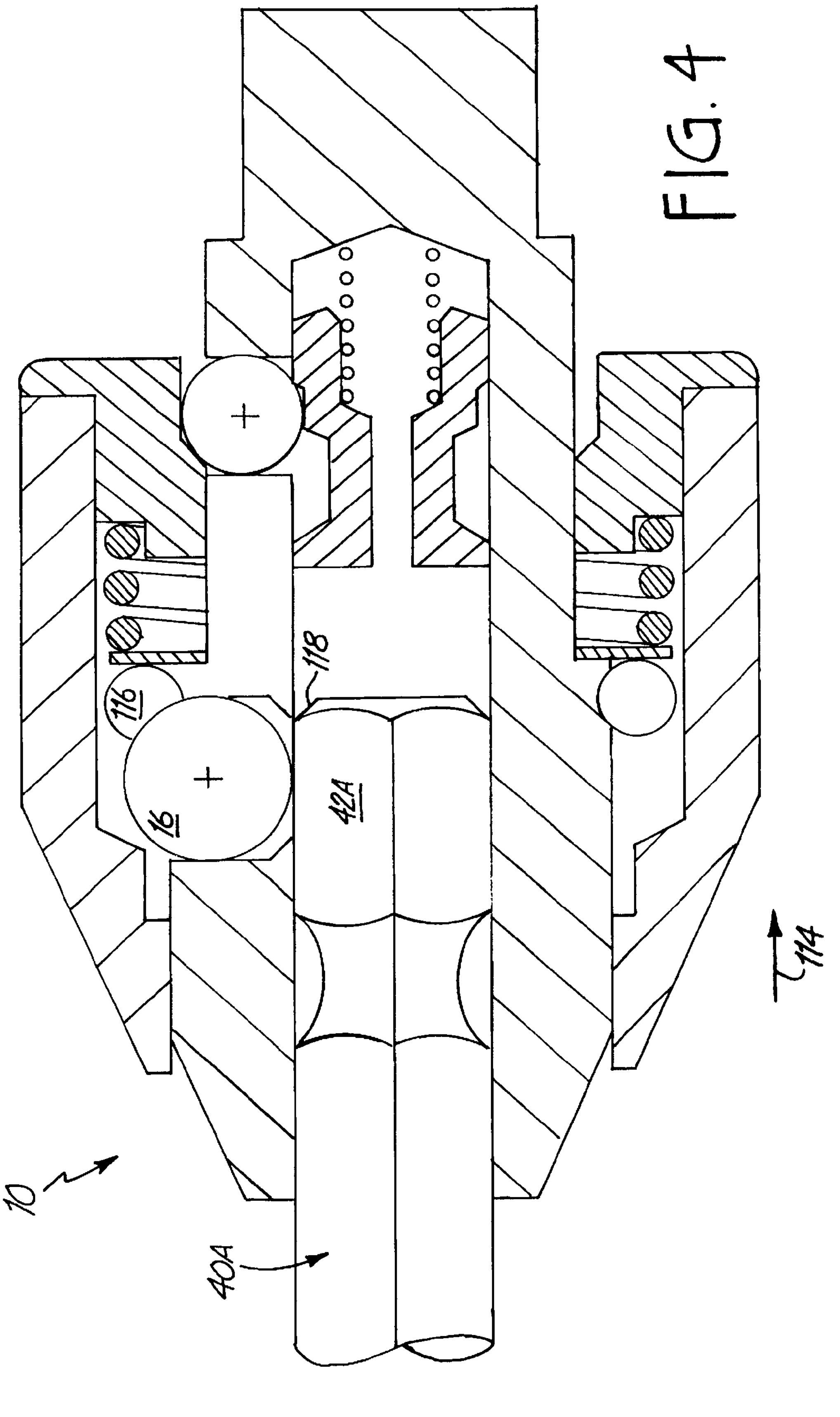
FIG. 4 shows a cross-sectional view of the chuck assembly showing the quick release feature of the chuck, with a second fitted shank portion of a tool bit extended partially into the chuck assembly.
Figure 5:
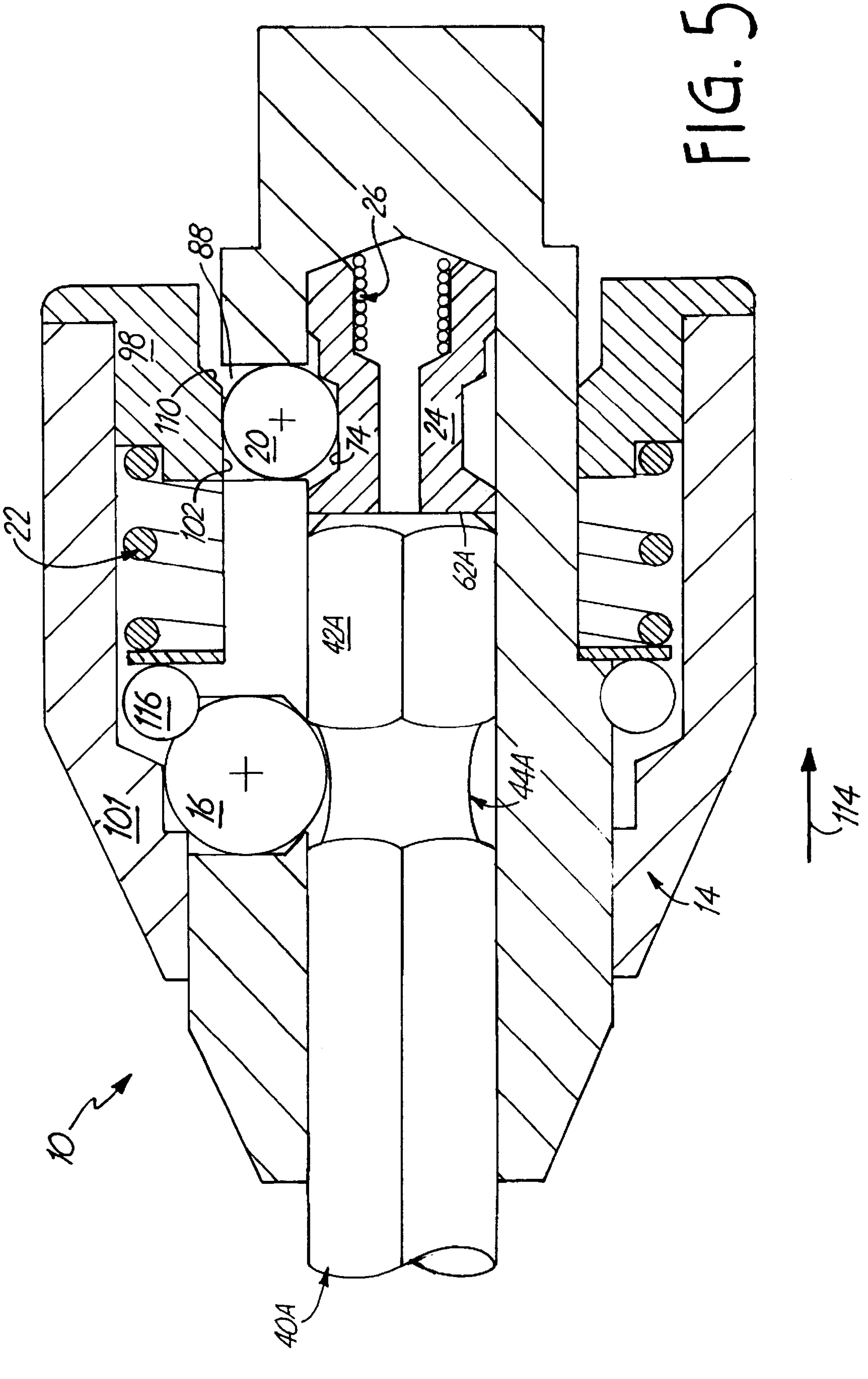
FIG. 5 shows a cross-sectional view of the chuck assembly showing the quick release feature of the chuck, with the second fitted shank portion extended into the chuck assembly to engage the shuttle.

As illustrated in FIG. 4, inserting a different tool bit 40A into the chuck 10 once again requires the operator to apply axial force (in direction of arrow 114) to the tool bit 40A to overcome the radially inward force applied to the bit detent ball 16 by the elastomeric O-ring 116. A tapered end 118 of the bit 40A pushes the ball 16 radially out of the hexagonal bore 36 (against the bias of the O-ring 116) to permit insertion of the tool bit 40A. The shank 42A of the tool bit 40A is extended into the hexagonal bore 36 (in the direction of arrow 114). The tool bit 40A is extended until it engages the bit face 62A of the shuttle 24 as illustrated in FIG. 5. As the operator continues to apply axial force to the tool bit 40A to overcome the compression force of the shuttle spring 26, the shuttle 24 is urged proximally (as arrow 114) until the lower face 74 of the shuttle 24 is aligned radially inward from the rear bore 88.

The sleeve spring 22 then urges the shuttle detent ball 20 radially inward through the rear bore 88 until it engages the lower face 74. The shuttle detent ball 20 is moved into the rear bore 88 inward from the inner face 102 of the rear shoulder 98 by the retaining face 110. Thus, the sleeve 14 is released from its locked position (FIG. 3), and the sleeve spring 22 urges the sleeve 14 into its rearward position (FIG. 5). The inner face 100 of the forward shoulder 101 forces the bit detent ball 16 radially inward into the circumferential groove 44A of the tool bit 40A, locking the new tool bit 40A into the chuck 10. Thus, multiple tool bits can be inserted, locked into place, and removed by the operator using one hand.

The inventive chuck 10 allows the operator to move the sleeve 14 forward with one hand where it is locked in place. He or she can then remove and insert the tool bits with the same hand used to move the sleeve 14 forward. This enables the operator to keep his or her other hand on the power tool used to drive the chuck 10, preventing the tool bits or the power tool from accidentally being dropped.

Figure 6:
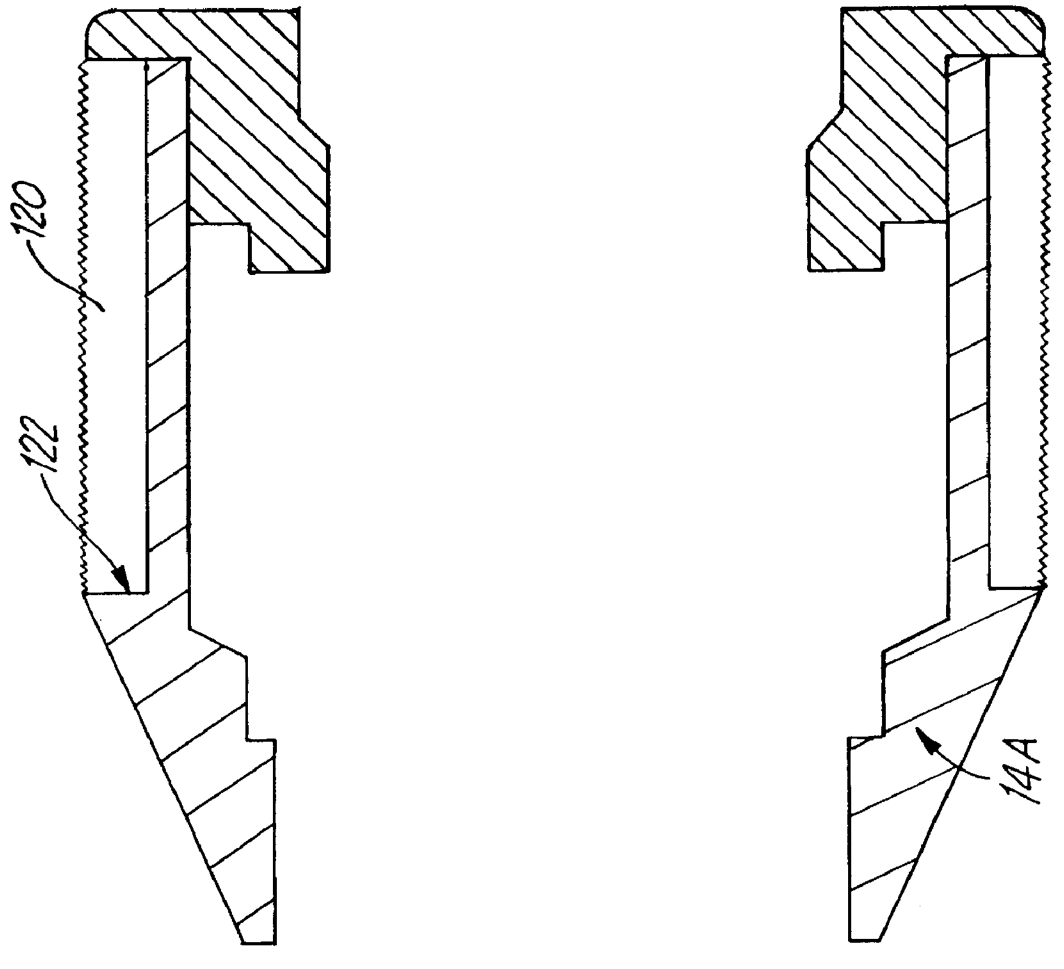
FIG. 6 shows a cross-sectional view of an alternative embodiment of the sleeve portion of the inventive chuck.

An alternate embodiment of the sleeve 14A is illustrated in FIG. 6. An annular rubber grip 120 can be inserted into an annular groove 122 disposed into the sleeve 14A. The rubber grip 120 provides the operator with a more ergonomic surface to grasp while moving the sleeve 14A forward when releasing the tool bit.

Although the present invention has been described with reference to preferred embodiments, workers skilled in the art will recognize that changes may be made in form and detail without departing from the spirit and scope of the invention. In particular, the present invention is directed to a chuck assembly with a spring-biased shuttle disposed in the longitudinal tool bit bore of the chuck assembly, and even more particularly, to the combination of such a shuttle and a sleeve to "place" the sleeve in a locked position against a spring biasing force. Fixing the sleeve position in this fashion allows the operator of the chuck to split the removal or insertion of the tool bit into two distinct operations, namely 1) moving the sleeve and 2) removing (or inserting) the tool bit into the chuck. Further, once the tool bit has been inserted, the sleeve is automatically placed in position to lock the tool bit into the hub, by operation of the biased shuttle, biased sleeve, and their associated detent balls.

The preferred embodiment of the invention as shown in FIGS. 1–5 can be defined as an improvement to a chuck assembly of the type having a chuck hub with a longitudinally extending bore 36 therein the longitudinally extending bore having a closed end 38, an open end 30, and a radially extending bit ball bore 86 in communication with the longitudinally extending bore 36, and a bit ball 16 movable in the bit ball bore 86 between a first retracted position out of the longitudinally extending bore 36 and a second engaged position partially in the longitudinally extending bore 36. The inventive improvement includes a shuttle 24 slidably disposed in the longitudinally extending bore 36. The shuttle 24 has a first longitudinally extending portion 78 having a first lateral dimension and a second longitudinally extending portion 74 having a second, smaller lateral dimension. The shuttle 24 is movable longitudinally between a first release position and a second lock position. The inventive improvement also includes a compression spring 26 urging the shuttle 24 away from the closed end 38 of the longitudinally extending bore 36, and a shuttle ball 20 disposed in a radially extending shuttle ball bore 88 in the chuck hub 12 which is in communication with the longitudinally extending bore 36 of the chuck hub 12. The shuttle ball 20 is movable in the shuttle ball bore 88 between a first retracted position where the shuttle ball 20 contacts the first longitudinally extending portion 78 of the shuttle 24 and a second extended position where the shuttle ball contacts the second longitudinally extending portion 74 of the shuttle 24.

In one preferred embodiment, when the shuttle ball 20 is in its second extended position, it extends further into the longitudinally extending bore 36 than the bit ball 16, when the bit ball 16 is in its second engaged position.

Preferably, the improved chuck hub also includes a sleeve 14 movable relative to the chuck hub 12 between a first shuttle release position and a second shuttle lock position. The sleeve 14 has a first shuttle ball contact surface 108 having a first radial dimension and a second shuttle ball contact surface 102 having a second smaller radial dimension. The first contact surface 108 engages the shuttle ball 20 when the sleeve is in its first shuttle release position and the shuttle ball 20 is in its first retracted position, and the second contact surface 102 engages the shuttle ball 20 when the sleeve 14 is in the second shuttle locked position and the shuttle ball 20 is in its second extended position.

The sleeve 14 is preferably movable longitudinally relative to the chuck hub 12. The second shuttle ball contact surface 102 on the sleeve 14 is preferably an inner circumferential surface. In a preferred embodiment, the chuck hub 12 has an outer circumferential surface 90 adjacent the shuttle ball bore 88, and the inner circumferential surface of the sleeve 14 has a slightly larger diameter than the outer circumferential surface 90 of the chuck hub 12.

The present invention can also be defined as a locking chuck assembly 10 for a tool bit shank 42 of the type which has a circumferential groove 44 disposed thereabout. The chuck assembly 10 includes a chuck hub 12 having a forward face 30A and a fixed radial extension 96. A longitudinal bore 36 is provided in the chuck hub 12 for receiving the tool bit shank 42, with the longitudinal bore 36 having a terminating face 38. A shuttle 24 is disposed in the bore 36. The shuttle 24 has a bit end 62, a spring end 60, a forward lower face 74 and a rearward interim face 78, and the shuttle is slidable along the longitudinal bore 36 between a rearward position and a forward position. A shuttle spring 26 is disposed between the spring end 60 of the shuttle 24 and the terminating face 38 of the longitudinal bore 36, with the shuttle spring 26 acting to bias the shuttle 24 to its forward position. A rear bore 88 extends radially through the chuck hub 12 proximate the terminating face 38 of the longitudinal bore 36 so as to be in communication with the longitudinal bore 36, and a shuttle detent ball 20 is disposed in the rear bore 88 so as to engage the shuttle 24. A front bore 86 extends radially through the hub 12 proximate the forward face 30A so as to be in communication with the longitudinal bore 36, and a bit detent ball 16 is disposed in the front bore 86 so as to engage the circumferential groove 44 of the tool bit shank 42. A sleeve 14 is disposed annularly about the chuck hub 12, and is slidable along the chuck hub 12 between a tool bit loaded position and a load/unload position. A sleeve spring 22 is disposed between the fixed radial extension 96 of the chuck hub 12 and the sleeve 14 to bias the sleeve 14 toward its tool bit loaded position. When the sleeve 14 is disposed in its tool bit loaded position, the shuttle 24 is positioned in its rearward position such that the shuttle spring 26 is compressed and the shuttle detent ball 20 is engaged with the forward lower face 74 on the shuttle 24 so as to prevent the shuttle spring 26 from moving the shuttle 24, while allowing the sleeve spring 22 to bias the sleeve 14. When the sleeve 14 is disposed in its load/unload position, the shuttle 24 is positioned in its forward position such that the shuttle spring 26 is less compressed than when the shuttle is in its rearward position and the shuttle detent ball 20 is engaged with the rearward interim face 78 on the shuttle 24 and the sleeve 14 is in a position to allow the shuttle spring 26 to bias the shuttle 24 away from the terminating face 38 of the longitudinal bore 36.

Figure 7:
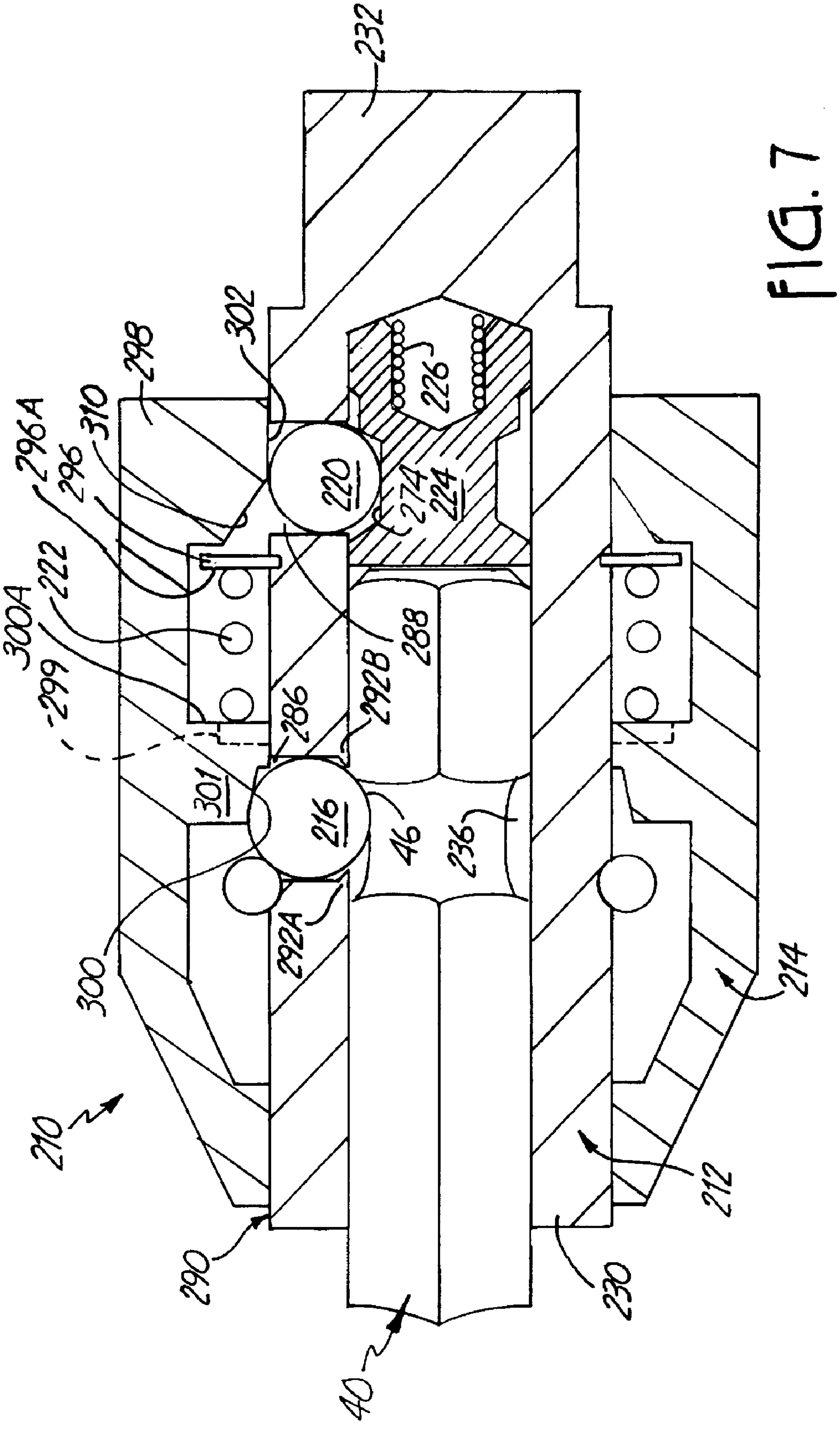
FIG. 7 is a cross-sectional view of an alternative embodiment of the chuck assembly of the present invention showing the quick release feature of the chuck, with a first fitted shank portion from a tool bit extended into the chuck assembly.

Another alternate embodiment of the invention is shown as chuck 210 in FIG. 7. Similar to the embodiment shown in FIGS. 1–6, the chuck 210 includes a chuck hub 212, a sleeve 214, a bit detent ball 216, a shuttle detent ball 220, a sleeve spring 222, a shuttle 224 and a shuttle spring 226.

As was described with respect to previous embodiments, the detent ball 216 and the shuttle detent ball 220 are held in their respective positions of extending into a (preferably hexagonal) tool bit bore 236 by-the movable sleeve 214 disposed around an outer cylindrical surface 290 of the chuck hub 212. In this embodiment, however, the shuttle assembly operates in the same manner but the structure is slightly modified so that the orientation for sleeve movement relative to the chuck hub is reversed (the rearward position of the sleeve is the "retracted" or "load/unload" position and the forward position of the sleeve is the "locking" or "tool bit loaded" position). To accomplish this, a sleeve spring 222 is disposed between a radial face 300A of a forward shoulder 301 of the sleeve 214 and a chuck hub radial face 296A, such as a washer 296 mounted about the outer cylindrical surface 90 of the chuck hub 212. The sleeve spring 222 thus biases the sleeve 214 toward a forward end 230 of the chuck hub 212. Rearward longitudinal movement of the sleeve 214 relative to the hub 212 compresses the sleeve spring 222 between the washer 296 and the forward shoulder 301. An annular notch 299 (shown in phantom in FIG. 7) may optionally be provided in the forward shoulder 301 to seat the sleeve spring 222 on the forward shoulder 301.

The sleeve spring 222 biases the movable sleeve 214 forward, bringing an angular inner face 300 of the forward shoulder 301 into contact with the bit detent ball 216 and causing an inner circumferential face 302 of a rear shoulder 298 to interact with the shuttle detent ball 220. The forward shoulder 301 urges the detent ball 216 radially inward into contact with the retaining shoulders 292A and 292B of a front radial bore 286 in the chuck hub 212, and the ball 216 extends partially into the tool bit bore 236. When a tool bit 40 is in the tool bit bore 236 (as shown in FIG. 7), the ball 216 is received within the circumferential groove 44 of the tool bit shank 42 and engages the rear radius shoulder 46 thereof (thus locking the tool bit from longitudinal movement relative to the tool bit bore 236).

In this embodiment, the forward shoulder 301 is disposed rearwardly of the front bore 286 (as opposed to being disposed forward of the front bore 86 in the first embodiment). Thus, as the sleeve 214 is biased by the sleeve spring 222 in a forward direction (or towards the forward end 230 of the hub 212) the forward shoulder 301 moves forwardly to engage the detent ball 216 (as opposed to rearwardly as was described in the previous embodiment). The locking in position of the detent ball 216 so as to fix the position of the tool bit 40 in place in the chuck hub 212 occurs as was described with respect to the first embodiment. The rear shoulder 298 includes a inner face 302 and a retaining face 310. The inner face 302 is disposed radially inwardly in relation to the retaining face 310. When the sleeve 214 is biased to its forward position, the inner face 302 is engaged with the shuttle detent ball 220 (see FIG. 7). The shuttle detent ball 220 is disposed in a rear radial bore 288 and is urged into the tool bit bore 236 and into contact with a lower face 274 on the shuttle 224, in the same fashion as was described with respect to the previous embodiment. In this embodiment, the inner face 302 is rearward of the retaining face 310 (towards a driven end 232 of the hub 212) as opposed to the previously described embodiment, where the retaining face 110 was disposed rearward of the inner face 102. It becomes apparent, therefore, that by simply reversing the relative positions of the surfaces which engage the bit detent ball and the shuttle detent ball and by switching the biasing orientation of the sleeve spring so as to bias the sleeve forwardly instead of rearwardly, the basic structure of the inventive locking quick-change chuck assembly is retained, although the direction the sleeve must be translated to operate the chuck is reversed. The shuttle operates the same in both instances.

Figure 8:
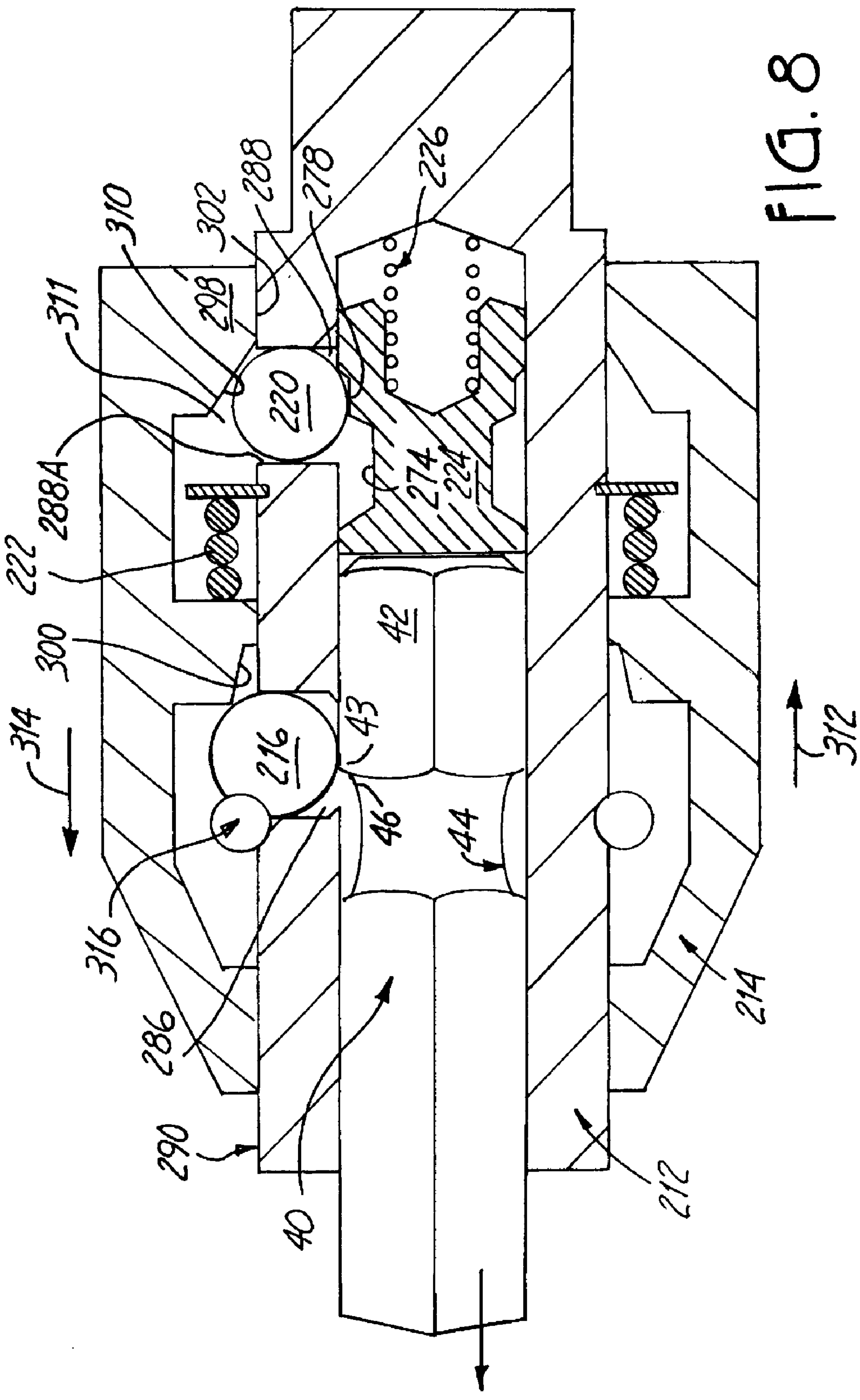
FIG. 8 is a cross-sectional view of the chuck assembly of FIG. 7, showing the quick release feature of the chuck in the loading and unloading position.

To illustrate, removing the tool bit 40 from the chuck 210 is illustrated in FIG. 8. The sleeve 214 is moved rearwardly in the direction of arrow 312 by the operator, compressing the sleeve spring 222. The inner face 300 of the forward shoulder 301 of the sleeve 214 is disengaged from the bit detent ball 216. Thus, the ball 216 is not constrained from rotation or radial movement out of the tool bit bore 236 (radially within the front bore 286) by the sleeve 214.

Additionally, the rearward movement 312 of the sleeve 214 allows the shuttle detent ball 220 to move radially out of the tool bit bore 236 through the rearbore 288. The rear shoulder 298 of the sleeve 214 is moved rearwardly relative to the rear bore 288 so that the inner face 302 thereof no longer prevents the shuttle detent ball 220 from moving radially outward from the tool bit bore 236. The retaining face 310 (which may also include a horizontal portion similar to the outer face 108 described with respect to the embodiment of FIG. 1) is defined to allow the shuttle detent ball 220 to travel into a cavity 311 formed between the retaining face 310 and the outer surface 290 of the chuck hub 212.

The shuttle spring 226 urges the shuttle 224 forward (to the position shown in FIG. 8) which in turn causes the shuttle 224 to push the shuttle detent ball 220 radially outward, through the rear bore 288 (as was described with respect to the first embodiment). The detent ball 220 moves radially outwardly until it encounters the retaining face 310 of the rear shoulder 298 of the sleeve 214. The ball 220 is stopped by the retaining face 310 of the rear shoulder 298 before it can pass completely out of the tool bit bore 236 and the rear bore 288. The shuttle 224 is free to move forward (in the same manner as was described with respect to the previous embodiment) until it rests on an interim face 278 of the shuttle 224.

Once the sleeve 214 is moved by the operator rearward 312 so that the shuttle detent ball 220 is able to move outward into the rear shoulder cavity 311, the operator can let go of the sleeve 214. The sleeve 214 continues to be urged forwardly (in direction of arrow 314) by the sleeve spring 222. However, the retaining face 310 on the sleeve 214 engages the shuttle detent ball 220 and prevents the sleeve 214 from returning to the forward position (its position in FIG. 7). The longitudinal bias force of the sleeve spring 222 on the sleeve 214 is transferred by the retaining face 310 of the rear shoulder 298 to the shuttle detent ball 220. The force of the sleeve spring 222 on the shuttle detent ball 220 is countered longitudinally by a wall 288A of the rear bore 288 and radially (in the normal direction) by the shuttle 224. The inventive chuck 210 is thereby placed in a tool bit load/unload mode, with the shuttle 224 biased to a forward position and the sleeve 214 locked in the rearward position (see FIG. 8).

Preferably, the forward movement of the shuttle 224 pushes the tool bit 40 partially out of the tool bit bore 236. Moving the tool bit 40 axially out of the chuck 210 (in the direction of arrow 314) displaces the bit detent ball 216 radially outwardly as the ball 216 rides up the rear radius shoulder 46 of the circumferential groove 44 of the tool bit shank 42 and onto the rear part 43 of the shank 42 (such as described previously).

The bit detent ball 216 is biased radially inwardly in the front bore 286. An elastomeric O-ring 316 is preferably disposed annularly about the hub 212 adjacent of the front bore 286. The O-ring 316 is disposed forward of the front bore 286 (versus rearward of the forward bore 86 in the first described embodiment) so as to not interfere with the movement of the forward shoulder 301 of the sleeve 214. The bit detent ball 216 and its related operative components thus serve to lock the tool bit 40 in place in the inventive chuck 210, and also to provide frictional resistance to longitudinal movement of the tool bit 40 along the tool bit bore 236 (by riding on the shank 42 of the tool bit 40). It would be understood by a person skilled in the art, however, that other methods for creating frictional resistance to the axial insertion or withdrawal of the tool bit 40 are known in the art and may be incorporated into the present invention without departing from the spirit and the scope of the invention. For example, additional bores and detent balls may be inserted into the hexagonal bore 236 to provide this described resistance, as is described in U.S. Pat. No. 5,417,527, which is incorporated by reference herein.

Figure 9:
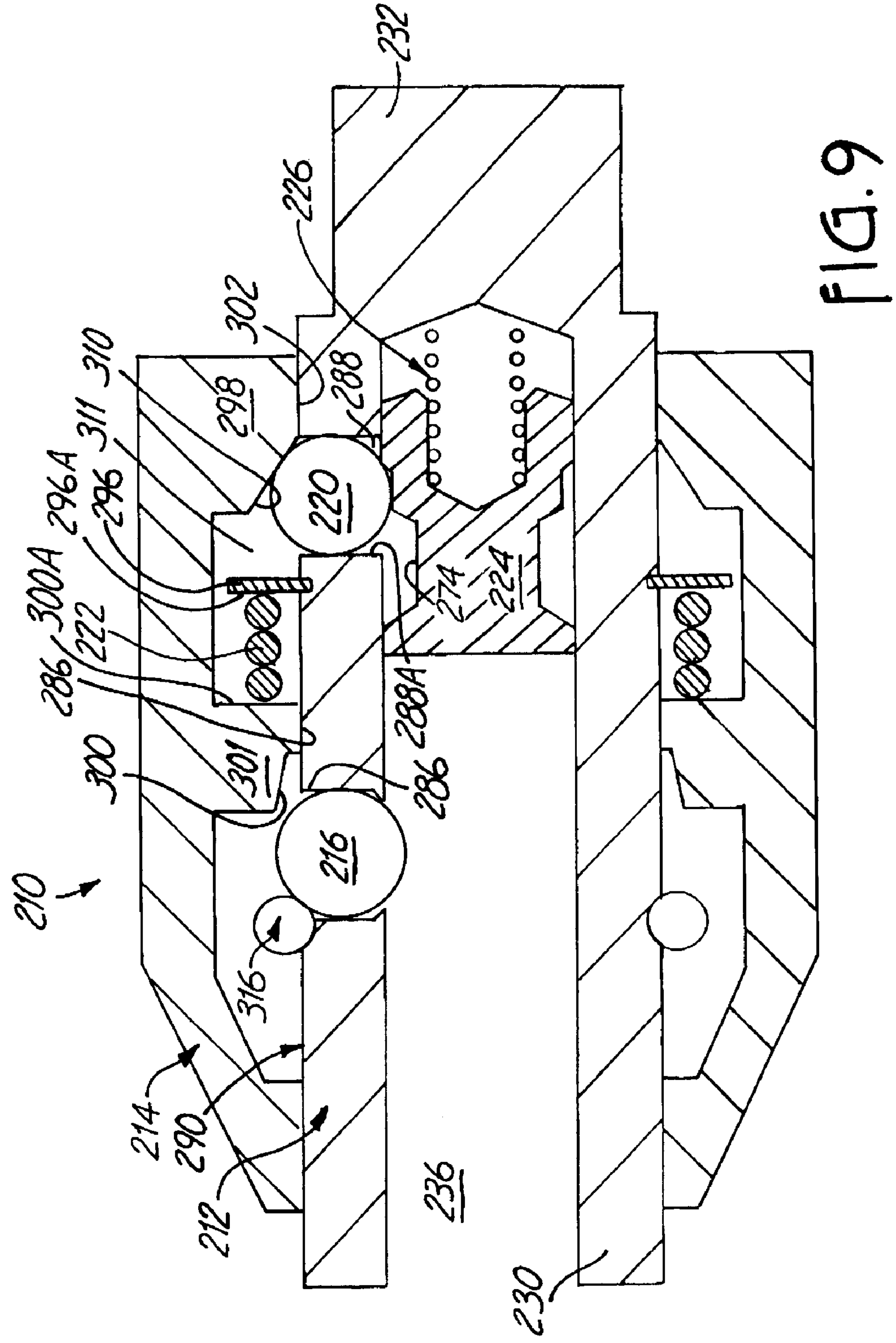
FIG. 9 shows a cross-sectional view of the chuck assembly of FIG. 7 showing the chuck assembly in the open position.

Once the tool bit 40 has been extracted from the tool bit bore 236, the O-ring 316 urges the detent ball 216 radially inward into the tool bit bore 236, as is illustrated in FIG. 9. The sleeve 214 remains in its rearward position, locked in place by the position of the shuttle detent ball 220, which in turn is held in place by the biased shuttle 224.

Figure 10:
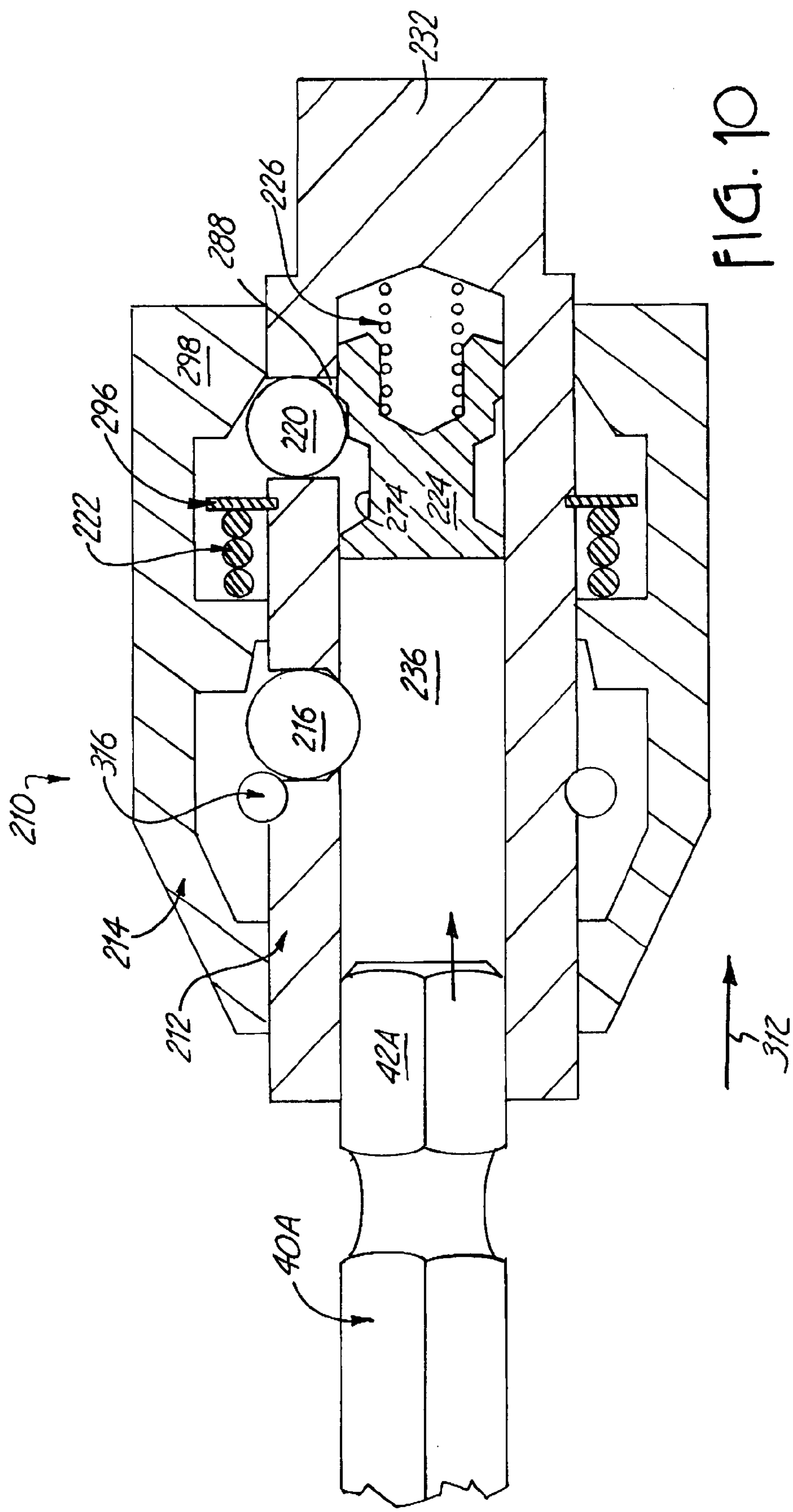
FIG. 10 shows a cross-sectional view of the chuck assembly of FIG. 7 showing the quick release feature of the chuck, with a second fitted shank portion of a tool bit extending partially into the chuck assembly.

As illustrated in FIG. 10, inserting a different tool bit 40A into the chuck 210 once again requires the operator to apply an axial force (in direction of arrow 312) to the tool bit 40A to overcome the radially inward force applied to the bit detent ball 216 by the elastomeric O-ring 316 (or other frictional method as discussed previously). The tool bit 40A is freely movable longitudinally within the tool bit bore 236 until a shank 42A of the tool bit 40A rearwardly passes the bit detent ball 216 (at which point the ball 216 exerts constant radially pressure on the shank 42A, thus inhibiting movement thereof, so the tool bit 40A can't fall out of the tool bit bore 236 inadvertently, even if the bit detent ball 216 isn't seated in a circumferential groove 44A of the tool bit shank 42).

Figure 11:
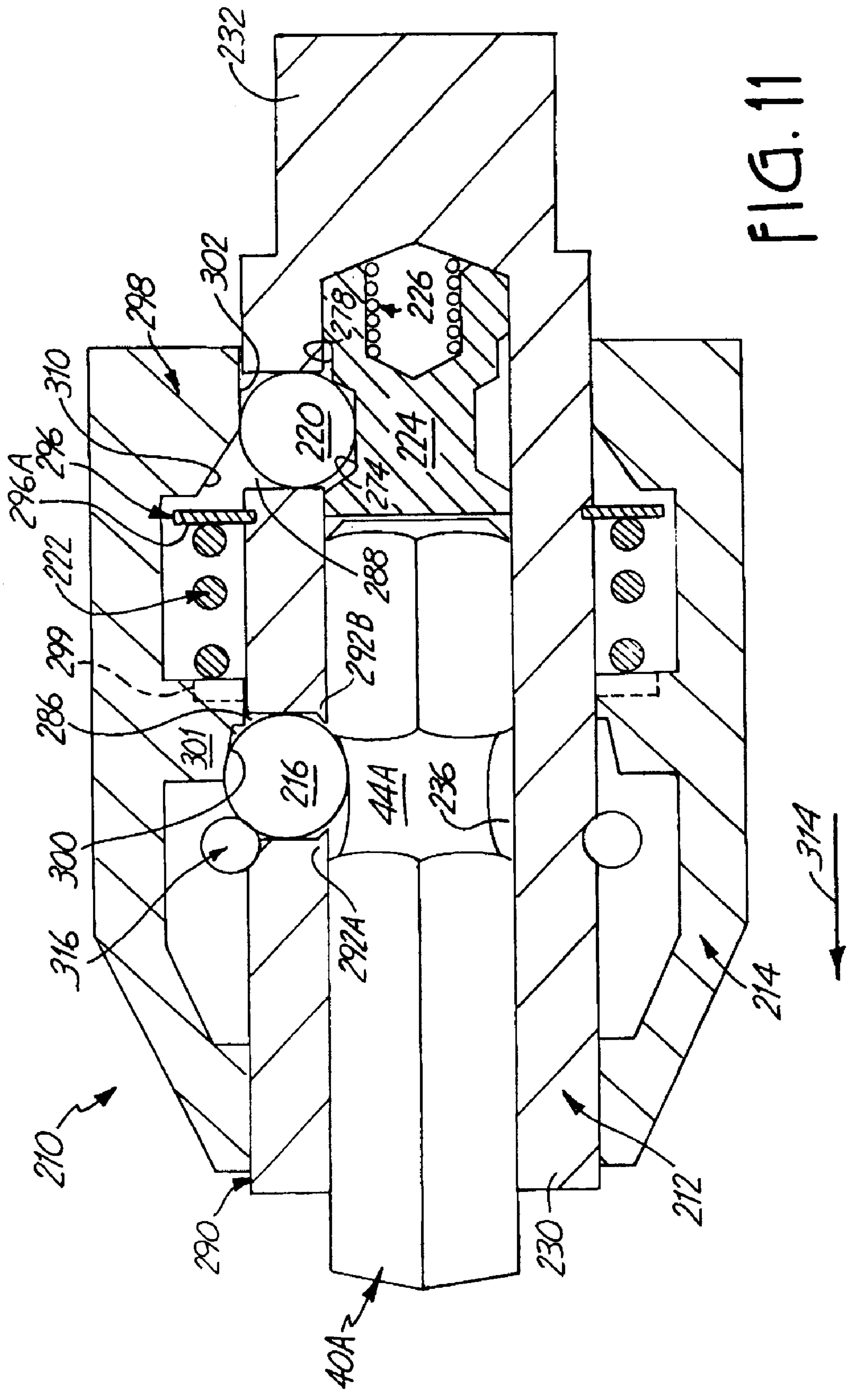
FIG. 11 shows a cross-sectional view of the chuck assembly of FIG. 7 showing the quick release feature of the chuck, with the second fitted shank portion extended into the chuck assembly to engage the shuttle.

As the tool bit 40A is pushed further into the tool bit bore 236, it engages the shuttle 224 (as was described in the previous embodiment with respect to FIG. 4). The shuttle 224 is then urged rearwardly (towards the driven end 232 of the chuck hub 212) until the lower face 274 of the shuttle 224 is aligned radially inwardly from the rear bore 288 (as shown in FIG. 11). At this point, the sleeve spring 222 urges the shuttle detent ball 220 radially inwardly toward the lower face 274 of the shuttle 220 via the retaining face 310. As the shuttle detent ball 220 moves radially inward, the sleeve 214 is released from its locked position and the sleeve spring 222 urges the sleeve 214 toward its forward position (in direction of arrow 314), as shown in FIG. 11. The inner face 300 of the forward shoulder 301 is thus moved into engagement with the bit detent ball 216 to urge the ball 216 radially inward into the circumferential groove 44A of the tool bit 40A, locking the new tool bit 40A into the chuck 210. Likewise, the inner face 302 on the rear shoulder 298 of the sleeve 214 is moved over the shuttle detent ball 220 to retain it in place adjacent the lower face 274 of the shuttle 224. The components are all held in these relative positions until the operator moves the sleeve 214 (against the bias of sleeve spring 222) to remove or change the tool bit 40A. Thus, the locked position of the sleeve can be accomplished by longitudinally sliding the sleeve relative to the chuck hub, either from a rearward position to a forward position (as illustrated, for example, by the first embodiment) or from a forward position to a rearward position (as illustrated, for example, by the second embodiment). The direction of sleeve motion relative to the chuck hub, the inner working sleeve profile and the placement and configuration of the sleeve spring and detent balls can vary significantly and yet be compatible with the sleeve lock out mechanism disclosed herein. For example, configurations such as shown in U.S. Pat. Nos. 4,900,202 and 5,013,194 can be implemented.

Figure 12:
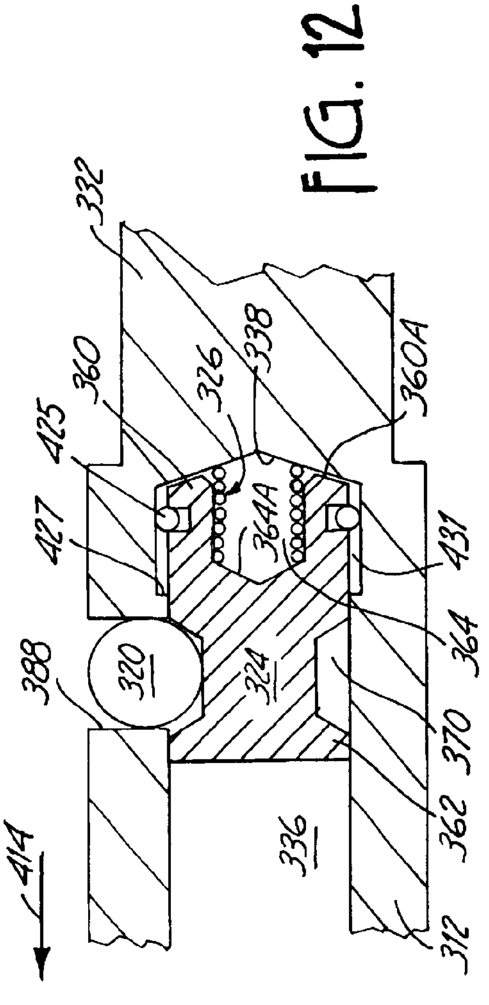
FIG. 12 shows an alternative shuttle embodiment in its rearward position.
Figure 12A:
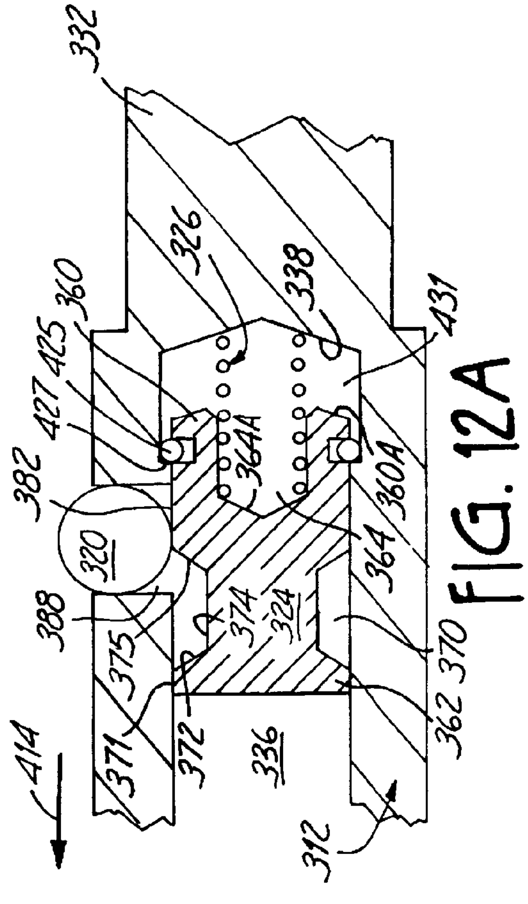
FIG. 12A shows the shuttle embodiment of FIG. 12 in its forward position.
Figure 12B:
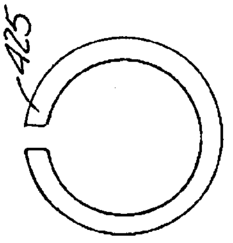
FIG. 12B shows the retaining clip used in the embodiment of FIGS. 12 and 12A.

Additionally, while it would be understood that the retaining faces and surfaces described previously create preferred profiles for the shuttle and sleeve of the inventive tool chuck, other profiles may be used. For example, an alternate shuttle embodiment is illustrated in FIGS. 12, 12A and 12B. A shuttle 324 is disposed in a longitudinal tool bit bore 336 in a chuck hub 330. A radial bore 388 has a shuttle detent ball 320 movably disposed therein. The shuttle 324 is biased forwardly (in direction of arrow 414) by a shuttle spring 326 disposed between a terminating face 338 of the bore 336 and the shuttle 324. The shuttle spring 326 has a spring end 360 and a distal bit end 362. The spring end 360 includes a spring face 360A which is shaped to engage the terminating face 338 of the bore 336 when the spring 326 is fully compressed. A spring bore 364 extends distally into the spring face 360A, coaxially with the longitudinal axis of the shuttle 324. The spring bore 364 terminates in the shuttle 324 along a distal bore shoulder 364A. The spring 326 engages at one end the distal bore shoulder 364A and at its other end the terminating face 338, and when the spring face 360A engages the terminating face 338, the spring is compressed within the spring bore 364 (see FIG. 12). In the above described shuttle embodiments, forward movement of the shuttle within the bore was limited by its interaction with the shuttle detent ball. In this embodiment, forward movement of the shuttle 324 (in direction of arrow 414) is limited by the abutment of a retaining clip 425 against an inner radial rim 427 defined in the bore 336 of the hub 330. The retaining clip 425 is retained on the spindle 324 in an annular outer groove 429 thereof. Adjacent its terminating end 328, the tool bit bore 336 is radially enlarged to define a shuttle travel bore 431 (which has a larger diameter than the tool bit bore 336, and extends between the terminating face 338 and inner annular rim 427). During assembly, the clip 425 is compressed radially into the groove 429 when the shuttle 324 is inserted axially into the tool bit bore 336 and shuttle bore 431. Once the clip 425 has moved rearwardly past the rim 427, it is allowed to expand radially into the shuttle bore 431 and therefore retain the shuttle 324 from movement forwardly past the position shown in FIG. 12A.

The operative surfaces on the shuttle 324 for the shuttle ball 320 are modified from the shuttle embodiments above. A locking hollow 370 is disposed annularly around the shuttle 324 and includes a forward face 371, forward wall 372, lower face 374, rear wall 375 and rear face 382. The forward face 371, lower face 374, and rear face 382 are circumferential surfaces that extend coaxially with the axis of the shuttle 324. The forward wall 372 is adjacent to and rearward from the forward face 371 and extends radially inward (towards the longitudinal axis of the shuttle 324) and slightly rearward (towards the driven end 332 of the chuck hub 312). The rear wall 375 extends from the lower face 374 radially outwardly and slightly rearwardly.

When the shuttle 324 is in its rearward position (when a tool bit has been fully inserted within the tool bit bore 336), the shuttle ball 320 is received within the locking hollow 370 and engages the lower face 374 and rear wall 375. In this position, the shuttle spring 326 is compressed (FIG. 12) and the sleeve (not shown) has a surface which prevents the shuttle ball 320 from radial outward movement. Once the sleeve has been moved to allow outward radial movement of the shuttle ball 320 (FIG. 12A), the shuttle spring 326 urges the shuttle 324 forwardly in the bores 336 and 431 until it reaches its forward movement limit (FIG. 12A) which is defined by engagement of the clip 425 and rim 427. The shuttle spring 326 and shuttle 324 thus serve to "pop" the tool bit slightly outwardly from the tool bit bore 336 once radial outward movement of the shuttle ball 320 is allowed, assuming also that the tool bit detent ball if one is employed in such a chuck hub assembly) is also allowed to move outwardly from the circumferential groove of the tool bit.

Finally, it should be noted that while the above embodiments of the invention have been described with respect to utilizing a sleeve and detent balls to lock a shuttle and tool bit into position, other tool locking designs are known in the art and could be incorporated to engage the shuttle and tool bit. These alternate locking designs can provide alternate methods of operation to the locking quick change chuck assembly. For example, spring-biased cross-pins (using a pin which is biased radially inward into the chuck bore) and tilting friction washers are known in the art and could be used to lock the shuttle and the tool bit in place in the chuck hub. Thus, any means which provides mechanical movement of a surface into the longitudinal bore of the chuck hub to engage the shuttle and/or the tool bit can be used without departing from the spirit and scope of the invention.

As mentioned above, other embodiments of the invention are possible. It is to be understood that the above description is intended to be a illustrative, and not restrictive. Many other embodiments will be apparent to those of skill in the art upon reviewing the above description. The scope of the invention should, therefore, be determined with respect to the appended claims along with the full scope of equivalence to which such claims are entitled.

What is claimed is:

1. In a chuck assembly of the type having a chuck hub which has a longitudinally extending bore therein, having a closed end, an open end, and a substantially hexagonal cross-sectional shape, a radially extending bit ball bore in communication with the longitudinally extending bore, and a bit ball movable in the bit ball bore between a first retracted position out of the longitudinally extending bore and a second engaged position partially in the longitudinally extending bore, the improvement which comprises:

a shuttle slidably disposed in the longitudinally extending bore, the shuttle having a spring end and a bit end, the shuttle having a first longitudinally extending portion having a first lateral dimension and a second longitudinally extending portion having a second, lateral dimension, the shuttle movable longitudinally between a first release position and a second lock position;

a compression spring urging the shuttle away from the closed end of the longitudinally extending bore; and a shuttle ball disposed in a radially extending shuttle ball bore in the chuck hub which is in communication with the longitudinally extending bore of the chuck hub, the shuttle ball being movable in the shuttle ball bore between a first retracted position where the shuttle ball contacts the first longitudinally extending portion of the shuttle and a second extended position where the shuttle ball contacts the second longitudinally extending portion of the shuttle.

2. The improvement of claim 1 wherein the shuttle has an annular shuttle ball engaging shoulder extending between the first and second portions of the shuttle.

3. The improvement of claim 2 wherein the shuttle ball contacts the shoulder when the shuttle ball is in its second extended position.

4. The improvement of claim 1 wherein the first portion of the shuttle is closer to the closed end of the longitudinally extending bore than the second portion of the shuttle.

5. The improvement of claim 4 wherein the shuttle has an annular shuttle ball engaging shoulder extending between the first and second portions of the shuttle.

6. The improvement of claim 1 wherein the shuttle ball, when the shuttle ball is in its second extended position, extends farther into the longitudinally extending bore than the bit ball, when the bit ball is in its second engaged position.

7. The improvement of claim 1, and further comprising:

a sleeve movable relative to the chuck hub between a first shuttle release position and a second shuttle lock position, the sleeve having a first shuttle ball contact surface having a first radial dimension and a second shuttle ball contact surface having a second, smaller radial dimension, wherein the first contact surface engages the shuttle ball when the sleeve is in its first shuttle release position and the shuttle ball is in its first retracted position and the second contact surface engages the shuttle ball when the sleeve is in its second shuttle lock position and the shuttle ball is in its second extended position.

8. The improvement of claim 7 wherein the sleeve is movable longitudinally relative to the chuck hub.

9. The improvement of claim 7 wherein the second shuttle ball contact surface on the sleeve is an inner circumferential surface.

10. The improvement of claim 9 wherein the chuck hub has an outer circumferential surface adjacent the shuttle ball bore, and the inner circumferential surface of the sleeve has a slightly larger diameter than the outer circumferential surface of the chuck hub.

11. The improvement of claim 1 wherein the shuttle has a spring bore extending longitudinally from the spring end to a spring bore face, wherein the compression spring is disposed between the closed end of the longitudinally extending bore and the spring bore face such that when the shuttle is in the second lock position, the spring end of the shuttle abuts the closed end of the longitudinally extending bore and the spring is disposed substantially within the spring bore.

12. The improvement of claim 7 wherein one shuttle ball simultaneously is in contact with the sleeve and the shuttle in all shuttle and sleeve positions.

13. A method of operating a portion of a chuck assembly of the type having a chuck hub which has longitudinally extending bore therein having a closed end, an open end, and a generally hexagonal cross-sectional shape, a radially extending bit ball bore in communication with the longitudinally extending bore, and a bit ball movable in the ball bore between a first retracted position out of the longitudinally extending bore and a second engaged position partially in the longitudinally extending bore, the method comprising the steps of:

providing a shuttle slidably disposed in the longitudinally extending bore, a compression spring for urging the shuttle away from the closed end of the longitudinally extending bore, and a shuttle ball disposed in a radially extending shuttle ball bore in the chuck hub which is in communication with the longitudinally extending, hexagonally shaped bore of the chuck hub; and moving the shuttle ball in the shuttle ball bore between a first retracted position where the shuttle ball contacts a rearward outer section of the shuttle which has a first lateral dimension and a second extended position where the shuttle ball contacts a forward outer section of the shuttle which has a second, smaller lateral dimension so as to limit the extent of forward movement of the shuttle in the longitudinally extending bore.

14. The method of claim 13, and further comprising the steps of:

providing a sleeve which is movable longitudinally on the chuck hub between a first position and a second position; and moving the sleeve between (1) the sleeve's first position which in turn causes the bit ball to move to its first retracted position and the shuttle ball to move to its first retracted position, and (2) the sleeve's second position which in turn causes the bit ball to move to its second engaged position and the shuttle ball to move to its second extended position.

15. The method of claim 13 and comprising:

providing a spring bore having a spring bore face in the shuttle;

disposing the compression spring between the spring bore face and the closed end of the longitudinally extending bore;

moving the shuttle longitudinally between a first release position and a second lock position;

engaging the shuttle with the closed end of the longitudinally extending bore when the shuttle is in the second lock position; and disposing the compression spring substantially within the spring bore when the shuttle is in the second lock position.

16. A locking chuck assembly for a tool bit shank of the type which has a generally hexagonal cross-sectional shape and a circumferential groove disposed thereabout, the chuck assembly comprising:

a chuck hub having a forward face and a fixed radial extension;

a longitudinal bore in the chuck hub for receiving the tool bit shank, the longitudinal bore having a terminating face and a generally hexagonal cross-sectional shape;

a shuttle disposed in the longitudinal bore, the shuttle having a bit end, a spring end, a forward lower face and a rearward interim face and the shuttle being slidable along the longitudinal bore between a rearward position and a forward position;

a shuttle spring disposed between the spring end of the shuttle and the terminating face of the longitudinal bore, wherein the shuttle spring acts to bias the shuttle to its forward position;

a rear bore extending radially through the chuck hub proximate the terminating face of the longitudinal bore so as to be in communication with the longitudinal bore;

a shuttle detent ball disposed in the rear bore so as to selectively engage the shuttle;

a front bore extending radially through the hub proximate the forward face of the longitudinal bore so as to be in communication with the longitudinal bore;

a bit detent ball disposed in the front bore so as to selectively engage the circumferential groove of the tool bit shank;

a sleeve disposed annularly about the chuck hub, the sleeve being slidable along the chuck hub between a tool bit loaded position and a load/unload position;

a sleeve spring disposed between the fixed radial extension of the chuck hub and the sleeve to bias the sleeve toward its tool bit loaded position;

wherein when the sleeve is disposed in its tool bit loaded position, the shuttle is positioned in its rearward position such that the shuttle spring is compressed and the shuttle detent ball is engaged with the forward lower face on the shuttle so as to prevent the shuttle spring from moving the shuttle, while allowing the sleeve spring to bias the sleeve; and wherein when the sleeve is disposed in its load/unload position, the shuttle is positioned in its forward position such that the shuttle spring is less compressed than when the shuttle is in its rearward position and the shuttle detent ball is engaged with an rearward interim face on the shuttle and the sleeve in a position to allow the shuttle spring to bias the shuttle away from the terminating face of the longitudinal bore.

17. The chuck assembly of claim 16, wherein the bit detent ball prevents the sleeve spring from further biasing the sleeve past its tool bit loaded position.

18. The chuck assembly of claim 16, wherein the cross-section of the longitudinal bore is sized such that when the tool bit shank is inserted in the longitudinal bore, the hexagonal tool bit shank engages the hexagonally shaped longitudinal bore.

19. The chuck assembly of claim 16 wherein the shuttle has a spring bore extending longitudinally from the spring end to a spring bore face, wherein the shuttle spring is disposed between the terminating face of the longitudinal bore and the spring bore face such that when the shuttle is in the rearward position, the spring end of the shuttle abuts the terminating face of the longitudinally extending bore, and the spring is disposed substantially within the spring bore.

20. A method for securing tool bit shanks having a hexagonally shaped cross section into a rotary power tool driver comprising:

providing a chuck assembly having a spindle releasably securable within the rotary power tool, a chuck hub which has longitudinally extending bore therein having a closed end, an open end, and a generally hexagonal cross-sectional shape, a radially extending bit ball bore in communication with the longitudinally extending bore, and a bit ball movable in the ball bore between a first retracted position out of the longitudinally extending bore and a second engaged position partially in the longitudinally extending bore;

providing a sleeve which is movable longitudinally on the chuck hub between a first position and a second position;

providing a shuttle slidably disposed in the longitudinally extending bore, a compression spring for urging the shuttle away from the closed end of the longitudinally extending bore, and a single shuttle ball disposed in a radially extending shuttle ball bore in the chuck hub which is in communication with the longitudinally extending, hexagonally shaped bore of the chuck hub;

inserting a first tool shank having a hexagonally shaped cross-section into the longitudinally extending bore so as to contact the shuttle and move the shuttle rearwardly;

moving the shuttle ball in the shuttle ball bore between a first retracted position where the shuttle ball contacts a rearward outer section of the shuttle which has a first lateral dimension and a second extended position where the shuttle ball contacts a forward outer section of the shuttle which has a second, smaller lateral dimension so as to limit the extent of forward movement of the shuttle in the longitudinally extending bore;

moving the bit ball into its second extended position so as to engage a circumferentially extending groove about the first tool shank having a hexagonally shaped cross-section;

moving the sleeve to the sleeve's first position which in turn causes the bit ball to move to its first retracted position and the shuttle ball to move to its first retracted position;

locking the sleeve into the first position with the shuttle ball;

extracting the first tool shank from the longitudinal bore.

* * * * *